US007125619B2

(12) United States Patent
Tsunoda

(10) Patent No.: US 7,125,619 B2
(45) Date of Patent: Oct. 24, 2006

(54) FUEL CELL AND FUEL CELL STACK

(75) Inventor: Tadashi Tsunoda, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 397 days.

(21) Appl. No.: 10/608,592

(22) Filed: Jun. 27, 2003

(65) Prior Publication Data

US 2004/0028986 A1    Feb. 12, 2004

(30) Foreign Application Priority Data

Jun. 28, 2002 (JP) .............................. 2002-190004
Aug. 28, 2002 (JP) .............................. 2002-249520
May 13, 2003 (JP) .............................. 2003-134190

(51) Int. Cl.
H01M 8/10    (2006.01)
H01M 2/14    (2006.01)
H01M 2/00    (2006.01)

(52) U.S. Cl. ............................ 429/32; 429/38; 429/34; 429/33

(58) Field of Classification Search ................. 429/32, 429/33, 34, 38
See application file for complete search history.

(56) References Cited

U.S. PATENT DOCUMENTS 3,492,165 A * 1/1970 Guillot et al. ................. 429/32
3,784,415 A   1/1974 Hopkins
5,049,458 A * 9/1991 Sato et al. ..................... 429/32
6,492,053 B1  12/2002 Donelson et al.
2004/0115503 A1  6/2004 Jacobson et al.

FOREIGN PATENT DOCUMENTS

| EP | 0 357 025 A1 | 3/1990 |
| JP | 02-75167 | 3/1990 |
| JP | 5-266910 A | 10/1993 |
| JP | 6-310164 A | 11/1994 |
| JP | 7-122287 A | 5/1995 |

* cited by examiner

Primary Examiner—Patrick Joseph Ryan
Assistant Examiner—Thomas H. Parsons
(74) Attorney, Agent, or Firm—Lahive & Cockfield, LLP; Anthony A. Laurentano, Esq.

(57) ABSTRACT

A fuel cell includes a pair of separators and a plurality of electrolyte electrode assemblies between the separators. The electrolyte electrode assemblies has a small circular disk shape. Eight electrolyte electrode assemblies are arranged along an inner circle and eight electrolyte electrode assemblies are arranged along an outer circle concentric with a circular hole. Each of the separators includes a plurality of plates stacked together. A fuel gas channel for supplying a fuel gas to anodes of the electrolyte electrode assemblies, an oxygen-containing gas channel for supplying an oxygen-containing gas to cathodes of the electrolyte electrode assemblies are formed between the plates.

9 Claims, 25 Drawing Sheets

← OXYGEN-CONTAINING GAS
←--- FUEL GAS

← OXYGEN-CONTAINING GAS
← FUEL GAS

← FUEL GAS

← OXYGEN-CONTAINING GAS
← FUEL GAS

← OXYGEN-CONTAINING GAS
←--- FUEL GAS

← OXYGEN-CONTAINING GAS
←--- FUEL GAS

FUEL CELL AND FUEL CELL STACK

BACKGROUND OF THE INVENTION

1. Field of the Invention

The present invention relates to a fuel cell having circular disk-shaped electrolyte electrode assemblies interposed between separators. Each of the electrolyte electrode assemblies includes an anode, and a cathode, and an electrolyte interposed between the anode and the cathode. Further, the present invention also relates to a fuel cell stack formed by stacking a plurality of such fuel cells.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates), and the electrolyte electrode assembly and the separators make up a unit of fuel cell for generating electricity. A predetermined number of fuel cells are stacked together to form a fuel cell stack.

In the fuel cell, an oxygen-containing gas or air is supplied to the cathode. The oxygen in the oxygen-containing gas is ionized at the interface between the anode and the electrolyte, and the oxygen ions ($O^{2-}$) move toward the anode through the electrolyte. A fuel gas such as hydrogen-containing gas or CO is supplied to the anode. Oxygen ions react with the hydrogen in the hydrogen-containing gas to produce $H_2O$ or react with CO to produce $CO_2$. Electrons released in the reaction flow through an external circuit to the cathode, creating a DC electric current.

Generally, the solid oxide fuel cell is operated at a high temperature in the range from 800° C. to 1000° C. The solid oxide fuel cell utilizes the high temperature waste heat for internal reforming to produce the fuel gas, and generates electricity by spinning a gas turbine. The solid oxide fuel cell is attractive as it has the highest efficiency in generating electricity in comparison with other types of fuel cells, and receiving growing attention for potential use in vehicles in addition to the applications in combination with the gas turbine.

Stabilized zironia has a low ion conductivity. Therefore, the electrolyte membrane formed of stabilized zirconia needs to be thin so that oxygen ions move through the electrolyte membrane smoothly for improving the power generation performance. However, the electrolyte membrane of the stabilized zirconia can not be very thin for maintaining the sufficient mechanical strength. Therefore, it is difficult to produce a large electricity using the membrane of stabilized zirconia in the solid oxide fuel cell.

In an attempt to address the problem, Japanese Laid-Open Patent Publication No. 5-266910 (prior art 1) discloses a solid oxide fuel cell system in which a plurality of cells are disposed on one surface (area) between adjacent separators. In the prior art 1, the plurality of cells are provided between the separators to increase the total surface area of the cells for generating a large current, while preventing damages to the electrolyte plate to improve the reliability of the fuel cell system.

FIG. 25 is a perspective view showing the fuel cell system disclosed in the prior art 1. As shown in FIG. 25, the fuel cell system includes a plurality of layers stacked together to form a stack body. Each of the layers includes a separator 1 and four cells 2 placed on the separator 1. A fuel gas plate 3 on the lowermost layer has supply ports and discharge ports for supplying and discharging a fuel gas. An oxygen-containing gas plate 4 on the uppermost layer has supply ports and discharge ports for supplying and discharging an oxygen-containing gas.

Fuel gas supply manifolds 5a, 5b extend through the separators 1 for supplying the fuel gas to each of the cells 2, and fuel gas discharge manifolds 5c, 5d extend through the separators 1 for discharging the fuel gas from each of the cells 2 after reaction. Further, oxygen-containing gas supply manifolds 6a, 6b extend through the separators 1 for supplying the oxygen-containing gas to each of the cells 2, and oxygen-containing gas discharge manifolds 6c, 6d extend through the separators 1 for discharging the oxygen-containing gas from each of the cells 2 after reaction.

The fuel gas supply manifolds 5a, 5b are connected to fuel gas supply pipes 7a, 7b at the fuel gas plate 3. The fuel gas discharge manifolds 5c, 5d are connected to fuel gas discharge pipes 7c, 7d at the fuel gas plate 3. The oxygen-containing gas supply manifolds 6a, 6b are connected to oxygen-containing gas supply pipes 8a, 8b at the oxygen-containing gas plate 4. The oxygen-containing gas discharge manifolds 6c, 6d are connected to oxygen-containing gas discharge pipes 8c, 8d at the oxygen-containing gas plate 4.

For example, in the fuel gas plate 3 of the fuel cell system, the fuel gas supplied to the fuel gas supply pipes 7a, 7b flows into the fuel gas supply manifolds 5a, 5b of the separators 1 in the stacking direction and the fuel gas is supplied to the anode of each cell 2. After the reaction at the anode, the fuel gas flows back to the fuel gas plate 3 through the fuel gas discharge manifolds 5c, 5d, flows into the fuel gas discharge pipes 7c, 7d, and is discharged to the outside of the fuel cell system. In the oxygen-containing gas plate 4, in the similar manner, the oxygen-containing gas is supplied to, and discharged from the fuel cell system through the oxygen-containing gas plate 4.

As described above, the fuel gas supplied to the fuel gas plate 3 and the oxygen-containing gas supplied to the oxygen-containing gas plate 4 flow through the separators 1, and supplied to four cells 2 on each of the separators 1. Therefore, the sealing structures for preventing the leakage of the reactant gases (fuel gas and oxygen-containing gas) are required for the separators 1 (one sealing structure is needed for every four cells 2). The sealing structures are considerably complicated in the fuel cell system.

The fuel gas plate 3 is connected to the fuel gas supply pipes 7a, 7b, and the fuel gas discharge pipes 7c, 7d. The oxygen-containing gas plate 4 is connected to the oxygen-containing gas supply pipes 8a, 8b, and the oxygen-containing gas discharge pipes 8c, 8d. Therefore, the overall fuel cell system is considerably large.

Further, Japanese Laid-Open Patent Publication No. 6-310164 (prior art 2) discloses another type of solid oxide fuel cell. In the solid oxide fuel cell, a plurality of unit cells each having a small surface area are provided on each of metallic separators, and a fuel gas supply hole and an oxygen-containing gas supply hole are formed centrally in each of the unit cells. The prior art 2 is directed to provide a fuel cell system having an improved reliability in which the total surface area of the cells on the separator is large, and the substrate is crack-free.

However, in the prior art 2, the unit cells may not be positioned at predetermined positions accurately. The fuel gas supply hole and the oxygen-containing gas supply hole provided centrally in each of the unit cells need to be accurately in alignment with a fuel gas supply manifold and an oxygen-containing gas supply manifold of the separator. The positioning operation is very difficult. Thus, the assembling operation of the fuel cell is laborious, and the production efficiency of the fuel cell is low.

Japanese Laid-Open Patent Publication No. 7-122287 (prior art 3) discloses an inside manifold system sheet type solid oxide fuel cell module. Gas separating plates are disposed at the upper end and lower end of a fuel cell stack. A plate made of the same material as that of the gas separating plates is provided outside of at least one of the gas separating plates. An insulative side surface supporting member for supporting side surface supporting member for supporting side surfaces of the fuel cell stack extends for each side surface of the cell stack. One end of the insulative side surface supporting member is joined to the plate.

However, the prior art 3 is directed to the prevention of misalignment of the cells and separating plates in the horizontal direction. Therefore, the prior art 3 does not enable plurality of cells to be positioned accurately on the separator surface.

SUMMARY OF THE INVENTION

A general object of the present invention is to provide a fuel cell and a fuel cell stack having a compact and simple structure, while maintaining the desired power generation performance.

Further, a main object of the present invention is to provide a fuel cell and fuel cell stack in which a plurality of electrolyte electrode assemblies are arranged, and the positioning operation of the electrolyte electrode assemblies is easily carried out, while maintaining the desired power generation performance.

According to the present invention, the electrolyte electrode assemblies may be arranged along at least one virtual circle concentric with a central axis of the separators. Thus, a large number of the electrolyte electrode assemblies are arranged between the separators. With the compact structure, the fuel cell has a high power outputting performance. Even if some of the electrolyte electrode assemblies have power failures, the fuel cell stack can be energized by the other electrolyte electrode assemblies. Therefore, the power generation can be performed reliably.

Further, each of the separators may include a plurality of plates which are stacked together. A fuel gas supply channel for supplying a fuel gas to the anode, and an oxygen-containing gas supply channel for supplying an oxygen-containing gas to the cathode may be provided between the plates. Since the fuel gas channel and the oxygen-containing gas channel are formed inside the separator, the sealing structure is simple in comparison with the structure in which the reactant gas channels (fuel gas channel and the oxygen-containing gas channel) extend in the stacking direction. With the simple structure, the desired sealing performance can be reliably maintained. Further, the overall size of the fuel cell is compact, and the power collecting efficiency is improved easily.

The electrolyte electrode assemblies are compact and thin. The temperature distribution on the electrode surface is uniform. In particular, when solid oxide is used, damages to the solid oxide due to heat stress are prevented, and the resistance polarization is reduced. Thus, the power outputting performance is improved.

According to the present invention, the electrolyte electrode assemblies may be arranged along at least two virtual circles concentric with a central axis of the separators. Therefore, a large number of the electrolyte electrode assemblies are arranged between the separators. With the compact structure, the fuel cell has a high power outputting performance. The electrolyte electrode assemblies are compact and thin. The temperature distribution on the electrode surface is uniform.

According to the present invention, inner electrolyte electrode assemblies may be out of radial alignment with outer electrolyte electrode assemblies. Therefore, the electrolyte electrode assemblies are arranged densely. With the compact structure of the fuel cell, the desired power generation performance is maintained. The fuel gas and the oxygen-containing gas after the reaction (exhaust gas) do not impinge on the inner electrolyte electrode assemblies. Therefore, turbulence does not occur, and the exhaust gas is smoothly guided to the exhaust gas hole.

According to the present invention, the inner electrolyte electrode assemblies and the outer electrolyte electrode assemblies may be arranged alternately. Therefore, the electrolyte electrode assemblies are arranged densely, and the fuel cell is compact.

According to the present invention, the fuel gas and the oxygen-containing gas may be supplied through the fuel gas channel and the oxygen-containing gas channel to central regions on opposite surfaces of the electrolyte electrode assemblies, respectively. The fuel gas and the oxygen-containing gas may flow outwardly from the central regions of the electrolyte electrode assemblies. Thus, the temperature distribution in the respective electrolyte electrode assemblies is small, damages due to heat stress are prevented, and the chemical reaction is uniformly performed on the entire power generation surfaces.

The flow rate of the fuel gas supplied to the electrolyte electrode assemblies is uniform, and the power utilization ratio of the fuel gas is improved. The entire surface area of the power generation surfaces is used efficiently, and the power generation performance is improved. The fuel gas and the oxygen-containing gas are supplied to opposite surfaces of the electrolyte electrode assemblies. The fuel gas and the oxygen-containing gas flow radially outwardly from the central regions on the opposite surfaces of the electrolyte electrode assemblies. Thus, no sealing structure for the fuel gas and the oxygen-containing gas is required between the electrolyte electrode assemblies and the separators, and the fuel cell has a simple structure.

According to the present invention, the fuel gas channel and the oxygen-containing gas channel may be provided between two of the plates of the separator. Thus, the layout of the fuel cell stack is simple, and the thickness of the fuel cell stack in the stacking direction is small.

According to the present invention, the discharge passage for discharging the fuel gas and the oxygen-containing gas after reaction may be provided between the separators. Manifolds for supplying and discharging the oxygen-containing gas and the fuel gas can be formed by the separators without any special components. Thus, the fuel cell stack has a simple structure.

According to the present invention, a circular hole for discharging the exhaust gas may be formed at the central region of the separators. The electrolyte electrode assemblies may have circular disk shape. The electrolyte electrode assemblies may be arranged along at least one virtual circle concentric with the circular hole.

Therefore, the sealing structure around the circular hole is simple. The exhaust gas simply flows toward the circular hole at the central region of the separators. Thus, the flow rate of the exhaust gas is uniform, and the exhaust gas is discharged from the electrolyte electrode assemblies smoothly.

According to the present invention, the electrolyte electrode assemblies may be arranged around the circular hole, along at least two virtual circles concentric with the circular hole. Thus, the electrolyte electrode assemblies are arranged densely, and the overall fuel cell is compact. The fuel cell has a high outputting performance, and the separators have a light weight.

According to the present invention, a plurality of circular disk-shaped electrolyte electrode assemblies may be arranged along at least one virtual circle concentric with a central axis of disk-shaped separators.

Each of the end plates may have holes for inserting bolts to tighten the fuel cell stack, and the holes and the electrolyte electrode assemblies may be arranged alternately. Therefore, the outer dimensions of the overall fuel cell stack are small, and the fuel cell stack is compact.

According to the present invention, at least one of the plates may have protrusions for positioning the electrolyte electrode assemblies between the separators. Therefore, the electrolyte electrode assemblies are positioned accurately and easily. The positions of the electrolyte electrode assemblies do not change due to thermal history or the like. The assembling operation of the fuel cell is efficiently performed, and the power generation performance in the respective fuel cells is greatly improved.

According to the present invention, the protrusions may be provided so that the electrolyte electrode assemblies are arranged along at least one virtual circle concentric with a central axis of the separators. Therefore, many electrolyte electrode assemblies are arranged densely between the separators. Thus, the electricity produced in the fuel cell per unit volume is increased. With the compact structure, the fuel cell has a high power outputting performance.

Even if some of the electrolyte electrode assemblies have power failures, the fuel cell stack can be energized by the other electrolyte electrode assemblies. Therefore, the power generation can be performed reliably.

According to the present invention, inner electrolyte electrode assemblies may be out of radial alignment with outer electrolyte electrode assemblies. Therefore, the electrolyte electrode assemblies are arranged densely. With the compact structure of the fuel cell, the desired power generation performance is maintained.

According to the present invention, at least three protrusions may be provided for positioning each of the electrolyte electrode assemblies inside the three protrusions with a clearance. The assembling operation of the electrolyte electrode assemblies can be performed simply by placing the electrolyte electrode assemblies inside the protrusions. Further, even if the electrolyte electrode assemblies are thermally expanded, the electrolyte electrode assemblies are not damaged.

According to the present invention, each of the disk-shaped separators may have protrusions for positioning the electrolyte electrode assemblies between the separators. The electrolyte electrode assemblies may be arranged along at least one virtual circle concentric with a central axis of the separators. Each of the flanges may have holes for inserting bolts to tighten the fuel cell stack. The holes and the electrolyte electrode assemblies may be arranged alternately. Therefore, the outer dimensions of the overall fuel cell stack are small, and the fuel cell stack is compact.

According to the present invention, at least three protrusions may be provided for positioning each of the electrolyte electrode assemblies inside the protrusions with a clearance. Therefore, the fuel cell can be assembled very simply, and damages to the electrolyte electrode assemblies due to thermal history or the like are effectively prevented.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
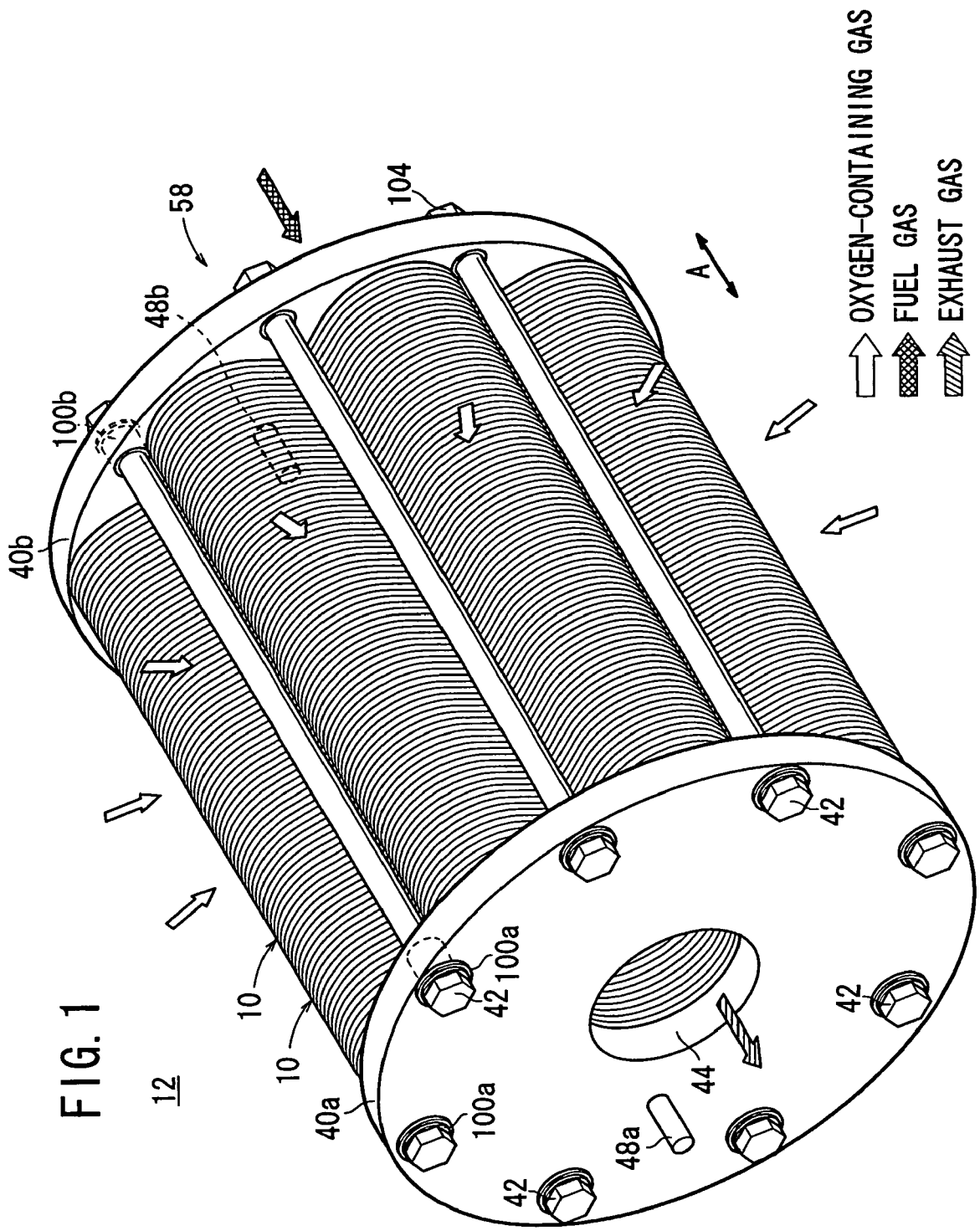
FIG. 1 is a perspective view schematically showing a fuel cell stack formed by stacking a plurality of fuel cells according to a first embodiment of the present invention.
Figure 2:
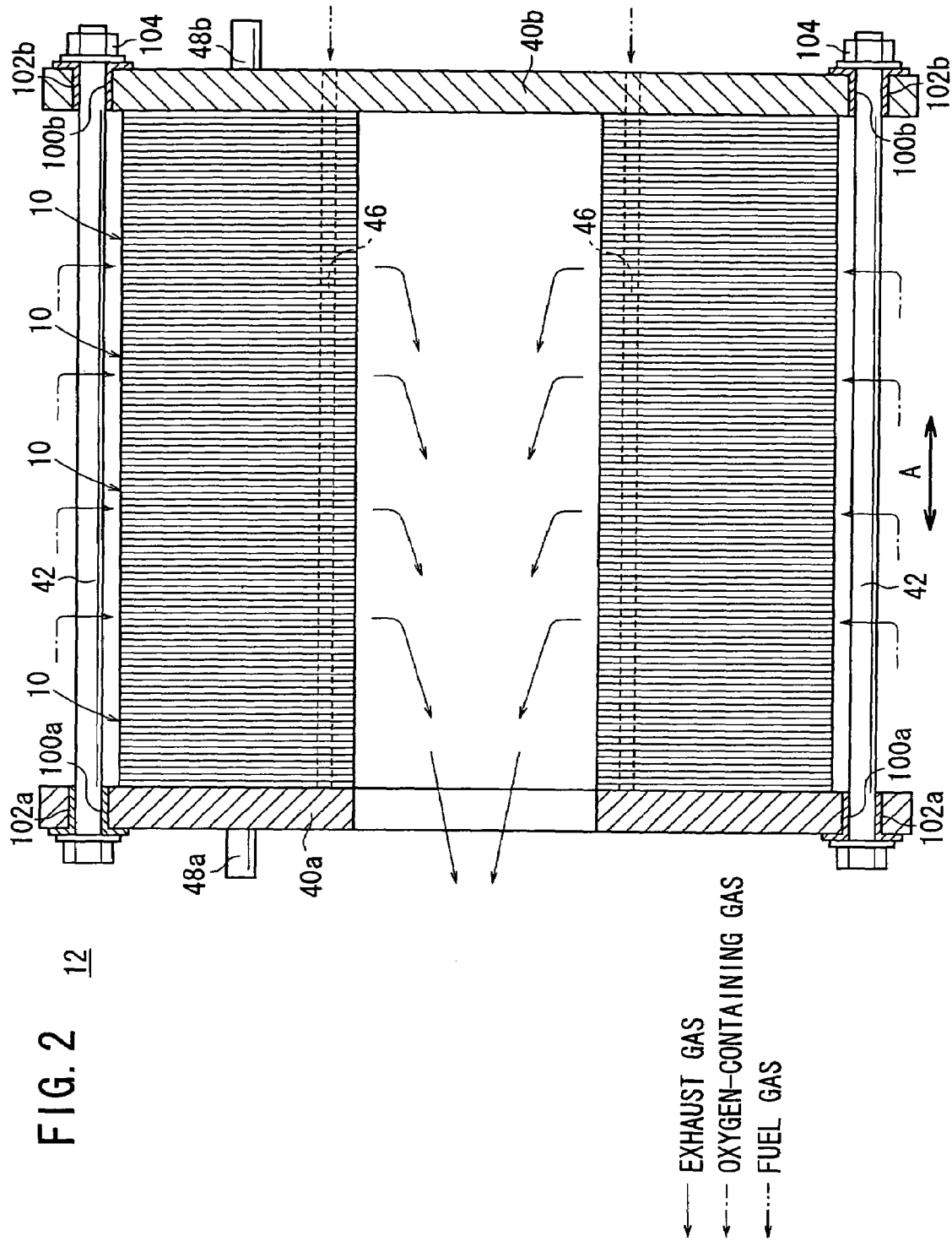
FIG. 2 is a cross sectional view showing a part of the fuel cell stack.

FIG. 1 is a perspective view schematically showing a fuel cell stack 12 formed by stacking a plurality of fuel cells 10 according to a first embodiment of the present invention, and FIG. 2 is a cross sectional view showing a part of the fuel cell stack 12.

Figure 3:
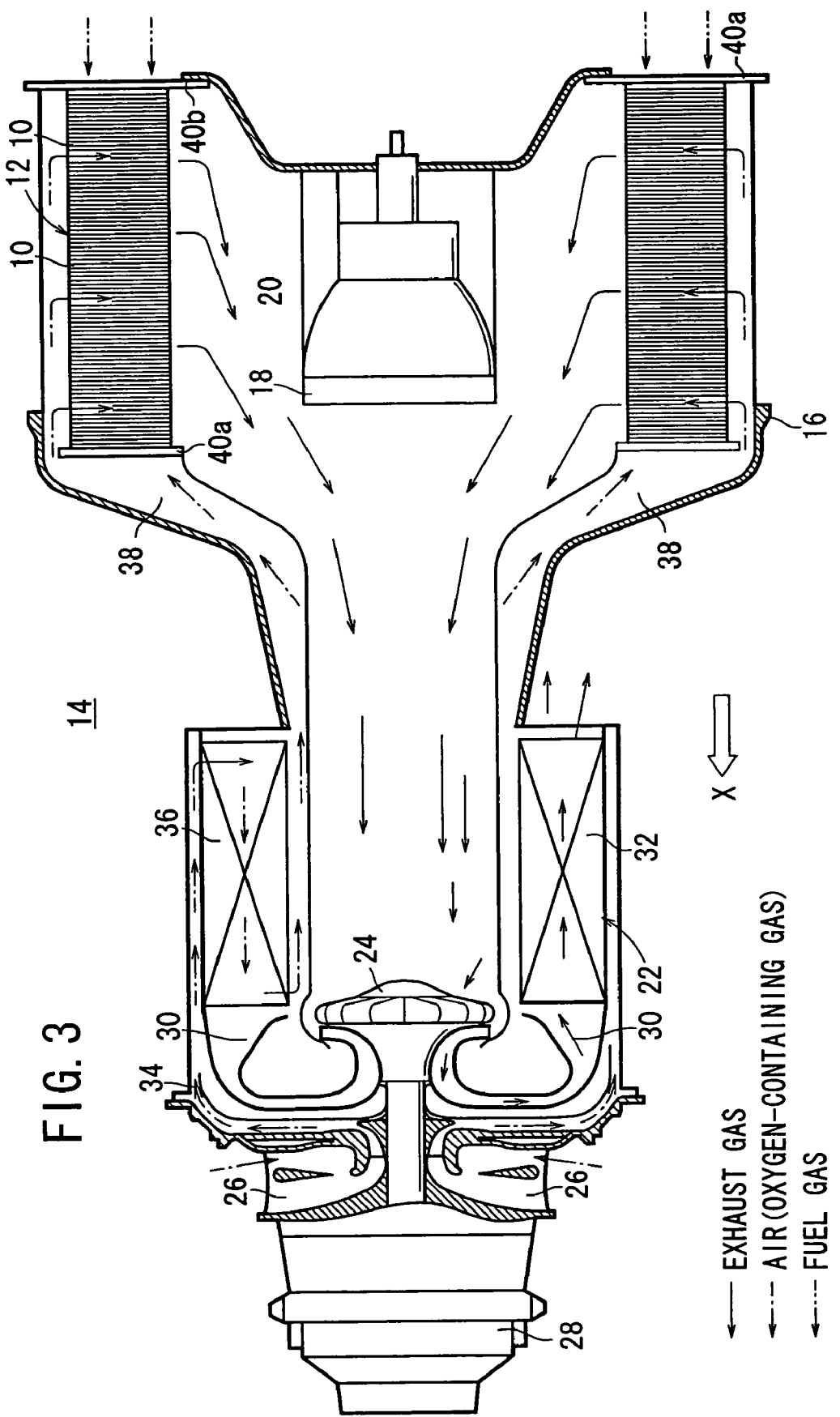
FIG. 3 is a view schematically showing a gas turbine including the fuel cell stack.

The fuel cell 10 is a solid oxide fuel cell (SOFC) for stationary and mobile applications. For example, the fuel cell 10 is mounted on vehicles. In an example of the first embodiment shown in FIG. 3, the fuel cell stack 12 is used in a gas turbine 14. In FIG. 3, the shape of the fuel cell stack 12 is different from those shown in FIGS. 1 and 2, however, the structure is substantially the same. The fuel cell stack 12 is disposed in a casing 16 of the gas turbine 14. A combustor 18 is disposed at the center of the fuel cell stack 12. The fuel cell stack 12 discharges an exhaust gas as a mixed gas of a fuel gas and an oxygen-containing gas after reaction into a chamber 20 toward the combustor 18. The chamber 20 is narrowed in a flowing direction of the exhaust gas indicated by an arrow X. A heat exchanger 22 is externally provided around the chamber 20 at a forward end in the flowing direction. Further, a turbine (power turbine) 24 is disposed at the forward end of the chamber 20. A compressor 26 and a power generator 28 are coaxially connected to the turbine 24. The gas turbine 14 has an axially symmetrical structure as a whole.

A discharge passage 30 of the turbine 24 is connected to a first passage 32 of the heat exchanger 22. A supply passage 34 of the compressor 26 is connected to a second passage 36 of the heat exchanger 22. The air is supplied to the outer circumferential surface of the fuel cell stack 12 through a hot air inlet passage 38 connected to the second passage 36.

As shown in FIG. 1, the fuel cell stack 12 is formed by stacking a plurality of fuel cells 10 in a stacking direction indicated by an arrow A. Each of the fuel cells 10 has a shape of a disk having a curved outer section. End plates (flanges) 40a, 40b are provided outside the outermost fuel cells 10 at opposite ends in the stacking direction, respectively. The fuel cells 10 and the end plates 40a, 40b are tightened together by a plurality of (e.g., eight) tightening bolts 42. At the center of the fuel cell stack 12, a circular hole 44 is formed for discharging the exhaust gas from the fuel cell stack 12. The circular hole 44 has a bottom at the end plate 40b, and extends in the direction indicated by the arrow A (see FIG. 2).

A plurality of (e.g., four) fuel gas supply passages 46 are formed along a virtual circle concentric with the circular hole 44. Each of the fuel gas supply passages 46 has a bottom at the end plate 40a, and extend from the end plate 40b in the direction indicated by the arrow A. The end plates 40a, 40b have output terminals 48a, 48b, respectively.

Figure 4:
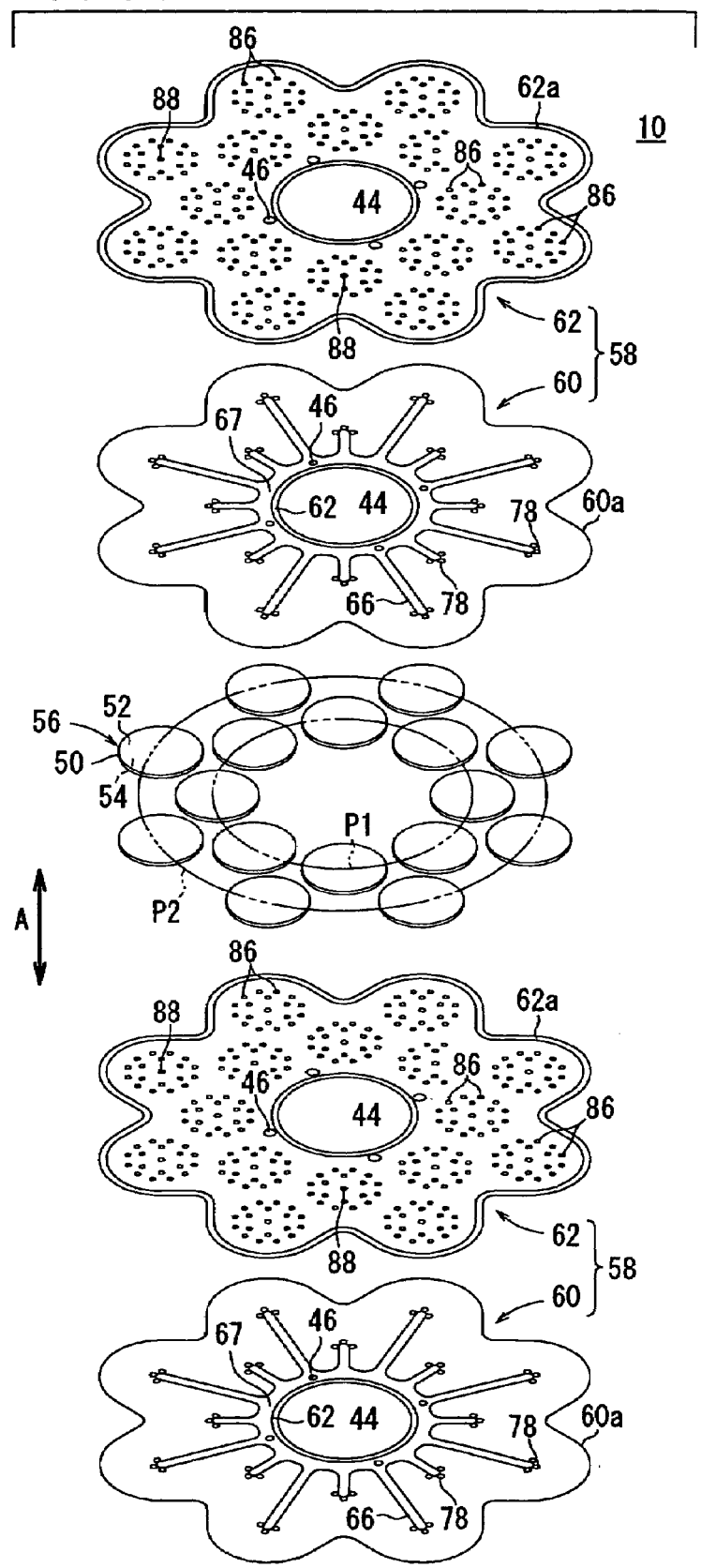
FIG. 4 is an exploded perspective view of the fuel cell.
Figure 5:
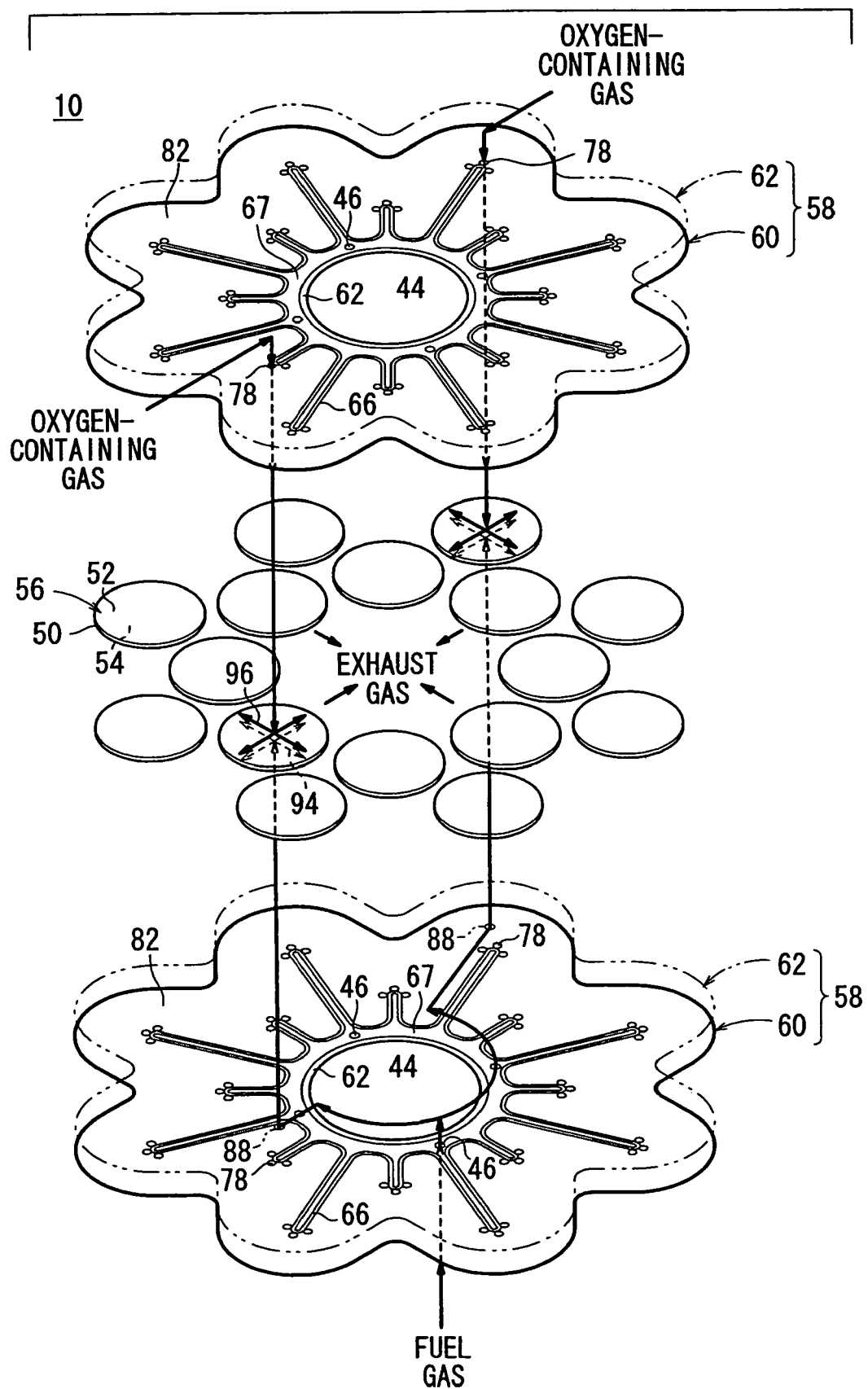
FIG. 5 is a perspective view showing a part of the fuel cell and operation of the fuel cell.

As shown in FIGS. 4 and 5, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. The electrolyte 50 is formed of an ion-conductive solid oxide such as stabilized zirconia. The electrolyte electrode assembly 56 has a relatively small circular disk shape.

A plurality of (e.g., 16) the electrolyte electrode assemblies 56 are interposed between a pair of separators 58 to form the fuel cell 10. The electrolyte electrode assemblies 56 are arranged along an inner circle P1 and an outer circle P2 which are concentric with the circular hole 44 formed at the center of the separators 58. The inner circle P1 passes through centers of eight inner electrolyte electrode assemblies 56, and the outer circle P2 passes through centers of eight outer electrolyte electrode assemblies 58 (see FIG. 4).

Each of the separators 58 includes a plurality of (e.g., two) plates 60, 62 which are stacked together. Each of the plates 60, 62 is formed of a stainless alloy, for example. Curved sections 60a, 62a are formed on the plates 60, 62, respectively.

Figure 6:
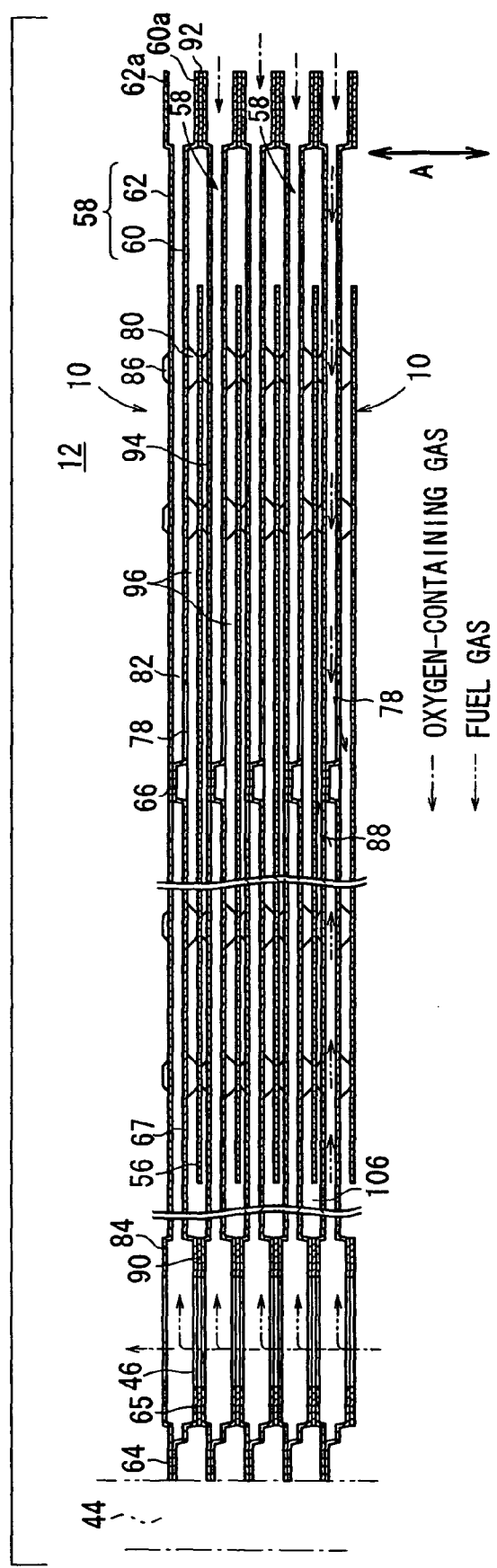
FIG. 6 is a cross sectional view, with partial omissions, showing the fuel cell stack.
Figure 7:
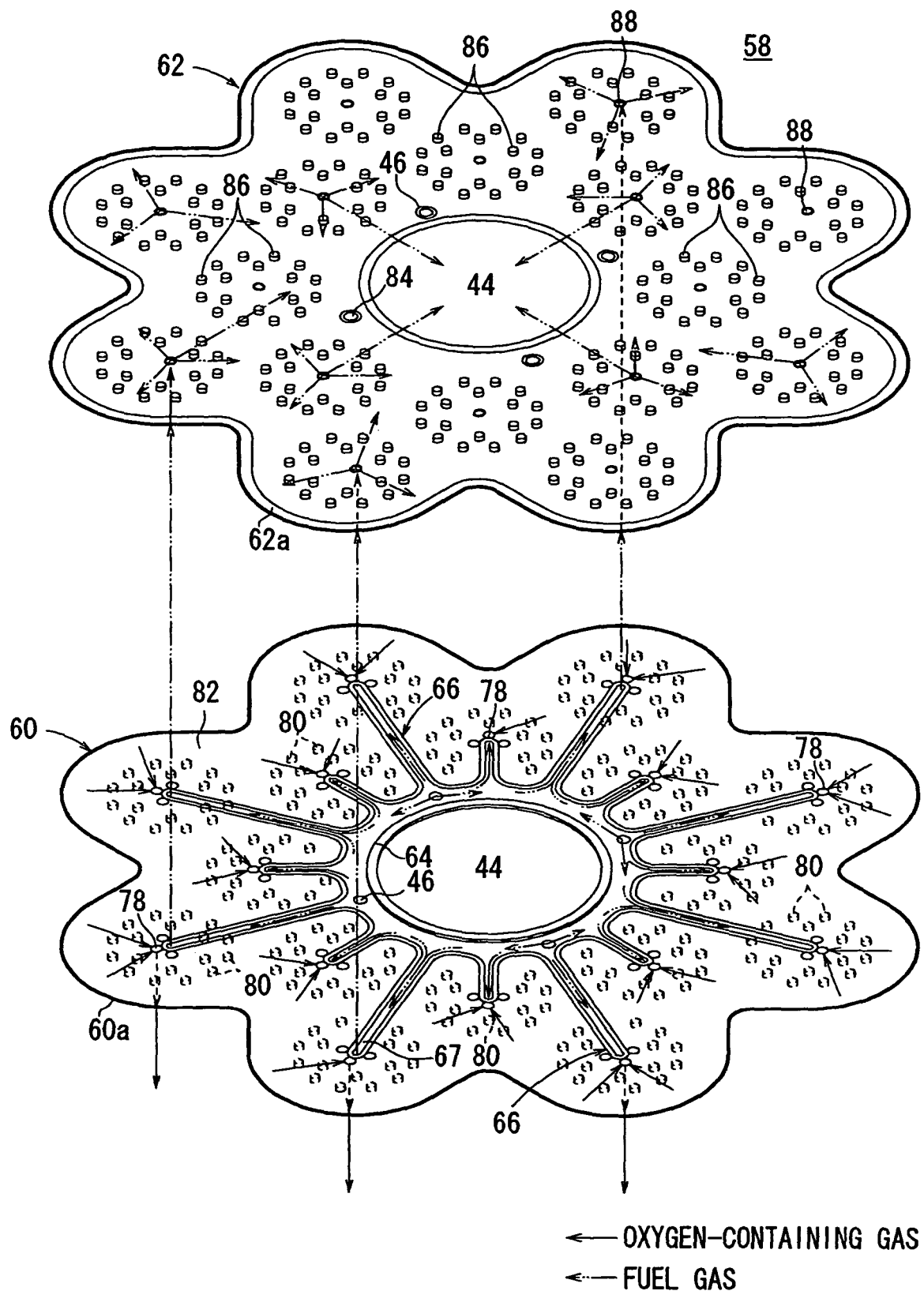
FIG. 7 is an exploded perspective view showing a separator of the fuel cell.
Figure 8:
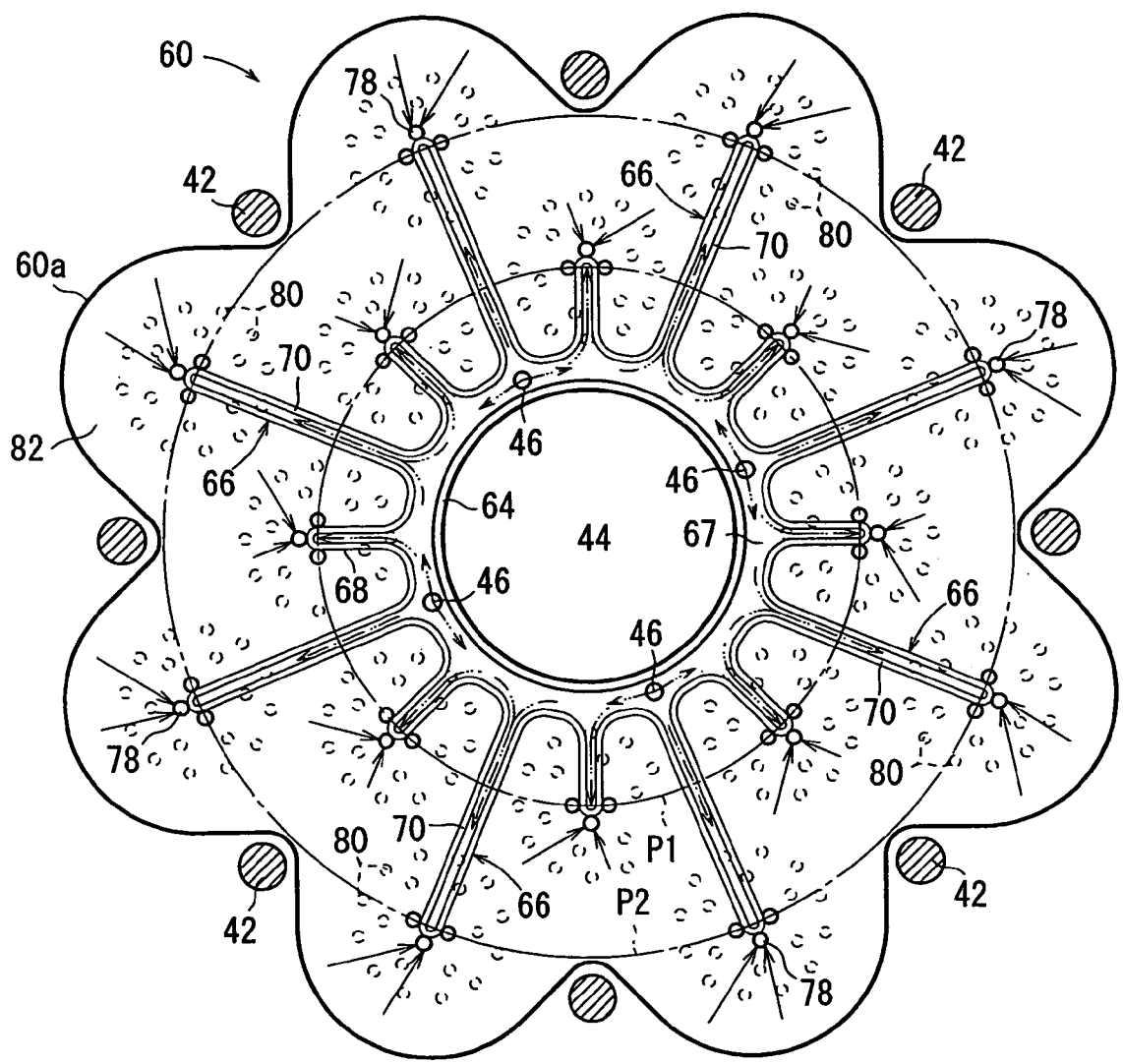
FIG. 8 is a front view showing a plate of the separator.

As shown in FIGS. 6 through 8, the plate 60 has an inner ridge 64 formed around the circular hole 44. The inner ridge 64 protrudes toward the plate 62. Further, the plate 60 has a protrusion 65 around the fuel gas supply passages 46. The protrusion 65 protrudes away from the plate 62. Further, the plate 60 has an outer ridge 66 formed concentrically with the inner ridge 64. A fuel gas channel 67 connected to the fuel gas supply passages 46 is formed between the inner ridge 64 and the outer ridge 66.

The outer ridge 66 includes first walls 68 and second walls 70 each extending radially outwardly by a predetermined distance. The first walls 68 and the second walls 70 are formed alternately. As shown in FIG. 8, each of the first walls 68 extends to the inner circle P1 which is a virtual line passing through centers of the eight inner electrolyte electrode assemblies 56. The first walls 68 are connected to the second walls 70. Each of the second walls 70 extends to the outer circle P2 which is a virtual line passing through the centers of the eight outer electrolyte electrode assemblies 56.

At each end portion of the first walls 68 and at each end portion of the second walls 70, three oxygen-containing gas inlets 78 are formed. The oxygen-containing gas inlets 78 are formed to pass through the surface of the plate 60. A first bosses 80 are formed on the plate 60. The first bosses 80 protrude toward, and contact the electrolyte electrode assemblies 56 arranged along the first circle P1 and the second circle P2.

A fuel gas channel 67 is formed inside the inner ridge 64 and the outer ridge 66 between the plate 60 and the plate 62. Further, an oxygen-containing gas channel 82 is formed outside the outer ridge 66. The oxygen-containing gas channel 82 is connected to the oxygen-containing gas inlets 78 on the plate 60.

Figure 9:
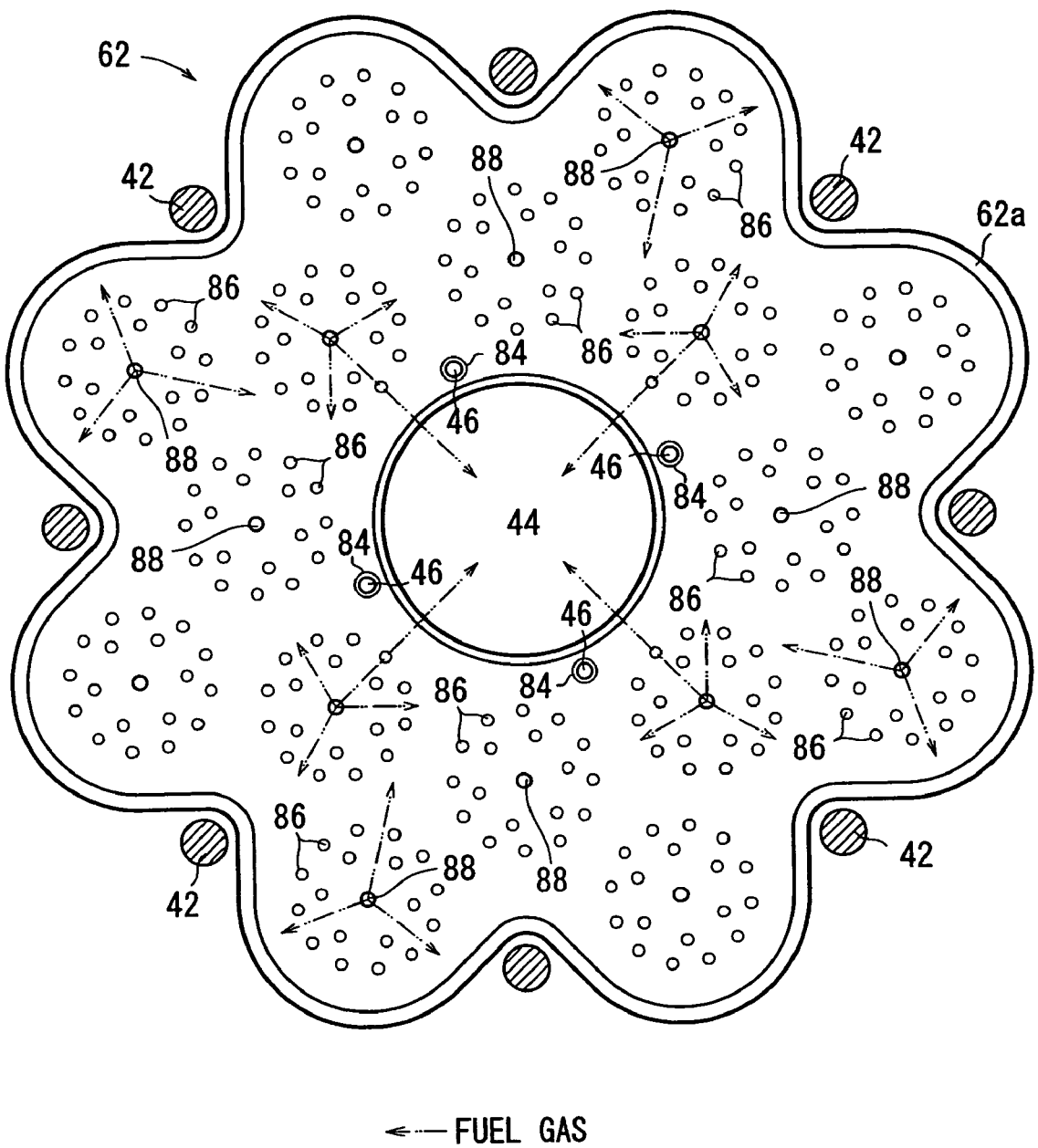
FIG. 9 is a front view showing the other plate of the separator.

As shown in FIGS. 6, 7, and 9, the plate 62 has protrusions 84 around the respective fuel gas supply passages 46. The protrusions 84 protrude away from the plate 60. Further, the plate 62 has second bosses 86 protruding toward, and contact the electrolyte electrode assemblies 56 arranged along the inner circle P1 and the outer circle P2. The second bosses 86 have small dimensions (height and diameter) in comparison with the first bosses 80. Fuel gas inlets 88 are formed to pass through the plate 62 to the inside of the end portions of the first wall 68 and the second wall 70, respectively.

The separator 58 has insulator seals 90 for sealing the fuel gas supply passages 46 (see FIG. 6). For example, the insulator seal 90 is formed by placing a ceramics plate on the plate 60 or the plate 62 or forming the insulator seal 90 on the plate 60 or the plate 62 by thermal spraying. The curved outer sections 60a, 62a protrude away from each other. An insulator seal 92 is provided on the curved outer section 60a or the curved outer section 62a by inserting the insulator seal 92 between the curved outer section 60a and the curved outer section 62a. Alternatively, the insulator seal 92 of ceramics or the like is formed on the curved outer section 60a or the curved outer section 62a by thermal spraying.

As shown in FIGS. 5 and 6, the electrolyte electrode assemblies 56 are interposed between the plate 60 of one separator 58 and the plate 62 of the other separator 58. Specifically, the plate 60 and the plate 62 outside the electrolyte electrode assemblies 56 has the first bosses 80 and the second bosses 86 protruding toward the electrolyte electrode assemblies 56 for sandwiching the electrolyte electrode assemblies 56.

Figure 10:
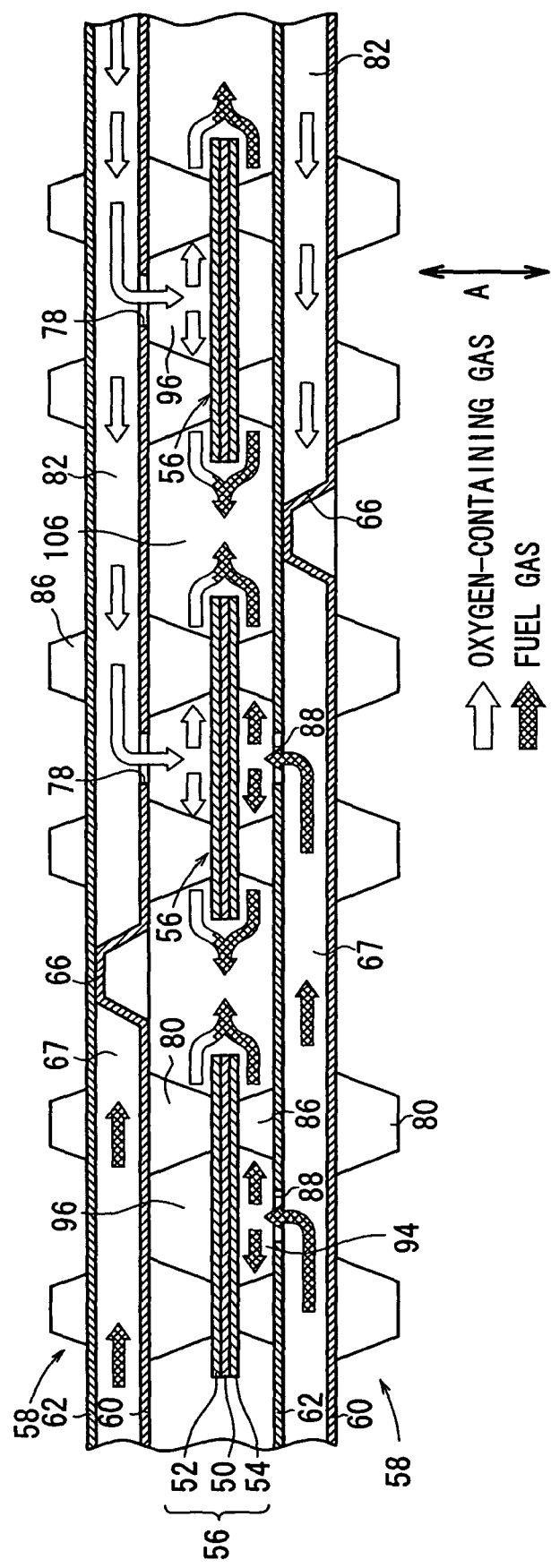
FIG. 10 is a view showing operation of the fuel cell.

As shown in FIG. 10, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the fuel gas is smaller than the flow rate of the oxygen-containing gas. Therefore, the dimensions of the second bosses 86 are smaller than the dimensions of the first bosses 80.

As shown in FIG. 6, the fuel gas channel 67 formed between the plates 60, 62 of the separator 58 is connected to the fuel gas supply passages 46. The oxygen-containing gas channel 82 and the fuel gas channel 67 are formed on the same area inside the separator. The oxygen-containing gas channel 82 is open to the outside through the spacing between the curved outer sections 60*a*, 62*a* of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66 of the plate 60 is in contact with the plate 62 for serially connecting the fuel cells 10 in the direction indicated by the arrow A.

As shown in FIGS. 1 and 2, the fuel cells 10 are stacked in the direction indicated by the arrow A. End plates 40*a*, 40*b* are disposed outside the outermost fuel cells 10 at opposite ends. The end plates 40*a*, 40*b* has holes 100*a*, 100*b* at positions corresponding to the inward curves of the curved outer sections 60*a*, 62*a* of the plates 60, 62. Insulator members 102*a*, 102*b* are attached in the holes 100*a*, 100*b*. The tightening bolts 42 are inserted in the insulator members 102*a*, 102*b*. Ends of the tightening bolts 42 are screwed into nuts 104 for tightening the fuel cells 10 together with a suitable force.

Next, operation of the fuel cell stack 12 will be described below.

In assembling the fuel cell 10, the plate 60 and the plate 62 are connected together to form the separator 58. Specifically, as shown in FIG. 6, the outer ridge 66 extending integrally from the plate 60 are connected to the plate 62 by brazing, and the ring-shaped insulator seals 90 are provided on the plate 60 or the plate 62 around the fuel gas supply passages 46 by thermal spraying, for example. Further, the insulator seal 92 having curves is provided on the curved outer section 60*a* of the plate 60 or the curved outer section 62*a* of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply passages 46, and the oxygen-containing gas channel 82 between the curved outer section 60*a* and the curved outer section 62*a* is open to the outside.

Then, the electrolyte electrode assemblies 56 are interposed between a pair of separators 58. As shown in FIGS. 4 and 5, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2. The first bosses 80 of the plate 60 and the second bosses 86 of the plate 62 protrude toward, and contact the electrolyte electrode assemblies 56.

As shown in FIG. 10, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas passage 106 is formed between the separators 58 for guiding the exhaust gas (mixed gas of the fuel gas and the oxygen-containing gas after reaction) to the circular hole 44.

A plurality of the fuel cells 10 as assembled above are stacked in the direction indicated by the arrow A to form the fuel cell stack 12 (see FIGS. 1 and 2).

The fuel gas such as a hydrogen containing gas is supplied to the fuel gas supply passages 46 of the end plate 40*b*, and the oxygen-containing gas such as air is supplied from the outside of the fuel cells 10 under pressure. The fuel gas supplied to the fuel gas supply passages 46 flows in the stacking direction indicated by the arrow A, and is supplied to the fuel gas channel 67 formed in each of the separators 58 of the fuel cells 10 (see FIG. 6).

As shown in FIG. 8, the fuel gas flows along the first walls 68 and the second walls 70 of the outer ridge 66, and flows into the fuel gas flow passage 94 (see FIG. 5). The fuel gas inlets 88 are formed at end portions of the first walls 68 and the second walls 70, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 10).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 from the oxygen-containing gas inlets 78, and flows outwardly from central regions of the cathodes 52 of the electrolyte electrode assemblies 56 (see FIGS. 5 and 10).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ion passes from the cathode 52 to the anode 54 through the electrolyte 50 to generate electricity by electrochemical reactions.

The electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted form the output terminals 48*a*, 48*b*. Even if some of the electrolyte electrode assemblies 56 have power failures, the fuel cell stack 12 can be energized by the other electrolyte electrode assemblies 56. Therefore, the power generation can be performed reliably.

After reaction of the fuel gas and the oxygen-containing gas, the exhaust gas moves outwardly from the central regions of the electrolyte electrode assemblies 56 through the exhaust passage 106 between the separators 58, and flows toward the center of the separators 58. The exhaust gas flows into the circular hole 44 formed at the center of separators 58, and is discharged from the circular hole 44 to the outside.

In the first embodiment, a plurality of (e.g., 16) circular electrolyte electrode assemblies 56 having a relatively small diameter are provided between a pair of separators 58. Thus, the electrolyte electrode assemblies 56 can be thin, and the resistance polarization is reduced. Further, temperature distribution is small, and damages due to heat stress are prevented. Therefore, the power generation performance of the fuel cells 10 is effectively improved.

Further, the eight inner electrolyte electrode assemblies 56 are arranged along the inner circle P1, and the eight outer electrolyte electrode assemblies 56 are arranged along the outer circle P2. The inner circle P1 and the outer circle P2 are concentric with the circular hole 44 positioned at the center of the separators 58. The eight outer eight electrolyte electrode assemblies 56 are positioned out of radial alignment with the eight inner electrolyte electrode assemblies 56. Stated otherwise, the inner electrolyte electrode assemblies 56 and the outer electrolyte electrode assemblies 56 are arranged alternately along the inner circle P1 and the outer circle P2, respectively.

The electrolyte electrode assemblies 56 can be arranged between the separators 58 densely. Thus, the overall fuel cell 10 can be made compact, while maintaining the desired power generation performance. Additionally, since the exhaust gas does not impinge on the inner electrolyte electrode assemblies 56 arranged along the inner circle P1, the turbulence of the exhaust gas does not occur, and the exhaust gas is guided to the circular hole 44 at the center of the separators 58. Since the exhaust gas from the electrolyte electrode assemblies 56 is discharged into the circular hole 44 without any turbulence, the flow rate of the exhaust gas is kept constant. Thus, the pressure loss in the fuel cell 10 is small, and the power generation performance is improved.

Each of the separators 58 has the two plates 60, 62, and the fuel gas channel 67 and the oxygen-containing gas channel 82 are formed between the plates 60, 62. Thus, in comparison with a structure in which reactant gas passages extend in the stacking direction, the sealing structure of the fuel cell 10 is greatly simplified. Thus, the reliable sealing performance is achieved desirably. Further, the overall size of the fuel cell 10 is reduced, and the improvement of the power collecting efficiency is achieved easily.

Further, in the first embodiment, the fuel gas flows from the fuel gas channel 67 into the fuel gas inlets 88 and the oxygen-containing gas flows from the oxygen-containing gas channel 82 into the oxygen-containing gas inlets 78. The fuel gas inlets 88 and the oxygen-containing gas inlets 78 are positioned at central regions on opposite surfaces of the electrolyte electrode assemblies 56 (see FIG. 10). The fuel gas and the oxygen-containing gas flow outwardly from the central regions of the electrolyte electrode assemblies 56. Therefore, the temperature distribution in the respective electrolyte electrode assemblies 56 is small, and damages due to heat stress are prevented. The electrochemical reaction is uniform on the entire power generation surface.

In the structure, the flow rate of the fuel gas supplied to each of the electrolyte electrode assemblies 56 is uniform. The utilization ratio of the fuel gas in the electrolyte electrode assembly 56 is improved, and the entire surface of the electrolyte electrode assembly 56 is used efficiently. Thus, the power generation performance is improved greatly.

The fuel gas and the oxygen-containing gas are supplied to the central regions on the opposite surfaces of the electrolyte electrode assemblies 56. The fuel gas and the oxygen-containing gas flow from the central regions on the opposite surfaces of the electrolyte electrode assemblies 56 radially outwardly. Thus, no sealing structure for the fuel gas and the oxygen-containing gas is required between the electrolyte electrode assemblies 56 and the separators 58, and the fuel cell 10 has a simple structure.

The fuel gas channel 67 and the oxygen-containing gas channel 82 are formed on the same area inside the separator 58. Therefore the layout in designing the structure of the fuel cell stack 12 is simplified, and the thickness of the fuel cell stack 12 in the stacking direction is reduced.

Further, the exhaust gas passage 106 for discharging the exhaust gas is formed in an area different from the area in which the fuel gas channel 67 and the oxygen-containing gas 82 are formed. The exhaust gas passage 106 is formed between the separators 58 (see FIG. 10). Thus, the separators 58 form the manifold for supplying the fuel gas and the oxygen-containing gas, and the manifold for discharging the fuel gas and the oxygen-containing gas. Thus, the fuel cell stack 12 can be constructed without the need of special components.

Further, in the first embodiment, the plates 60, 62 of the separator 58 has curved outer sections 60*a*, 62*a*. The plates 60, 62 are curved inwardly toward the circular hole 44 at positions between the electrolyte electrode assemblies 56 arranged along the outer circle P2. The inward curves of the plates 60, 62 are formed for providing tightening bolts 42 (see FIG. 1). Thus, the outer dimensions of the overall fuel cell stack 12 are effectively reduced, and the fuel cell stack 12 is small.

The curved outer sections 60*a*, 62*a* function as inlets for receiving the air having a relatively low temperature. Therefore, the tightening bolts 42 are not heated excessively, and the service life of the tightening bolts 42 is extended.

Next, the operation of the fuel cell stack 12 used in the gas turbine 14 shown in FIG. 3 will be described briefly.

As shown in FIG. 3, in starting the operation of the gas turbine 14, the combustor 18 is energized to spin the turbine 24, and energize the compressor 26 and the power generator 28. The compressor 26 functions to guide the external air into the supply passage 34. The air is pressurized and heated to a predetermined temperature (e.g., 200° C.), and supplied to the second passage 36 of the heat exchanger 22. A hot exhaust gas as a mixed gas of the fuel gas and the oxygen-containing gas after reaction is supplied to the first passage 32 of the heat exchanger 22 for heating the air supplied to the second passage 36 of the heat exchanger 22. The heated air flows through the hot air supply passage 38, and supplied to the fuel cells 10 of the fuel cell stack 12 from the outside. Thus, the power generation is performed by the fuel cells 10, and the exhaust gas generated by the reaction of the fuel gas and the oxygen-containing gas is discharged into the chamber 20 in the casing 16.

At this time, the temperature of the exhaust gas discharged from the fuel cells (solid oxide fuel cells) 10 is high, in the range of 800° C. to 1000° C. The exhaust gas spins the turbine 24 for generating electricity by the power generator 28. The exhaust air is supplied to the heat exchanger 22 for heating the external air. Therefore, it is not necessary to use the combustor 18 for spinning the turbine 24.

The hot exhaust gas in the range of 800° C. to 1000° C. can be used for internally reforming a fuel supplied to the fuel cell stack 12. Therefore, various fuels such as natural gas, butane, and gasoline can be used for the internal reforming.

Figure 11:
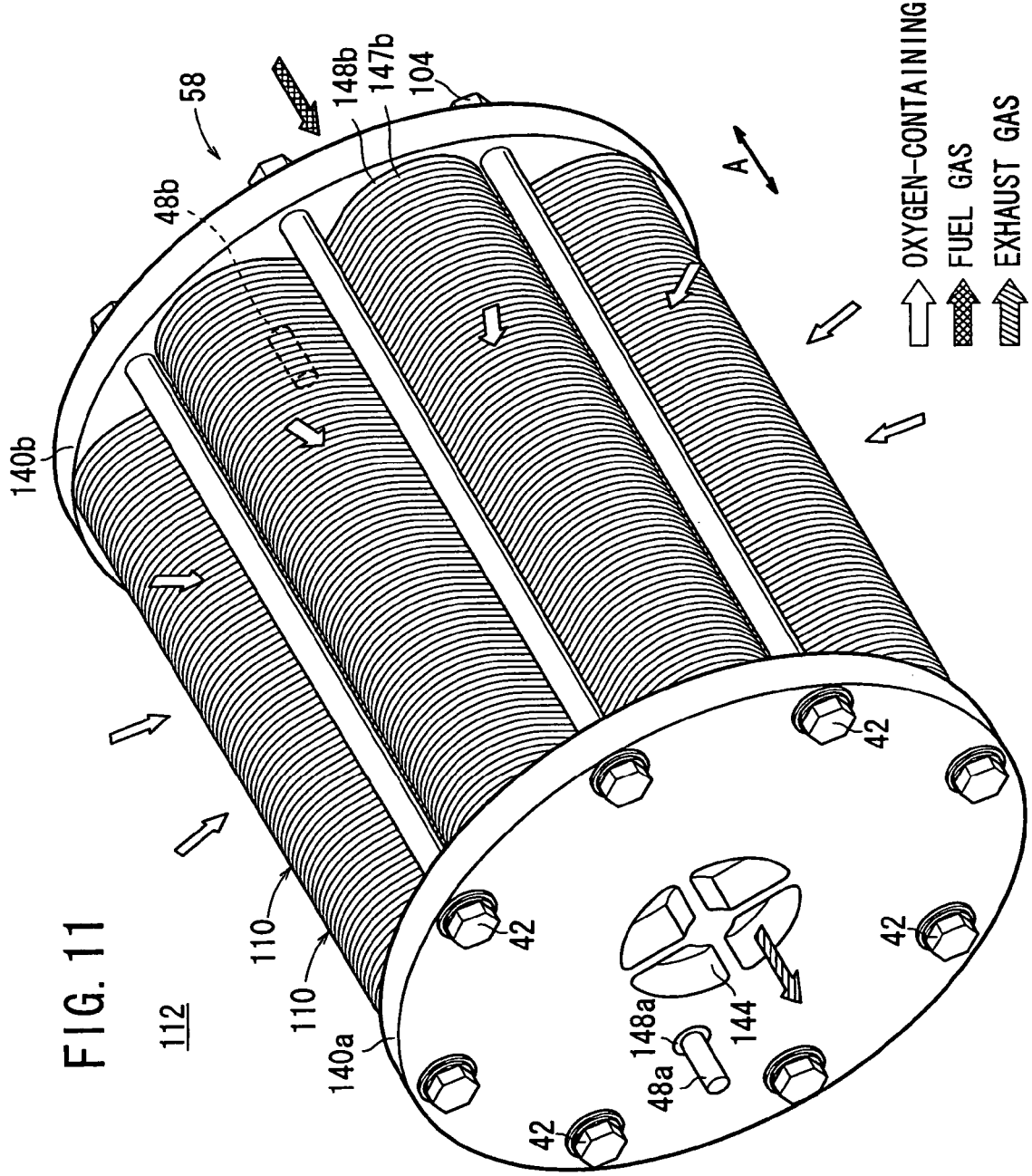
FIG. 11 is a view schematically showing a fuel cell stack formed by stacking a plurality of fuel cells according to a second embodiment of the present invention.
Figure 12:
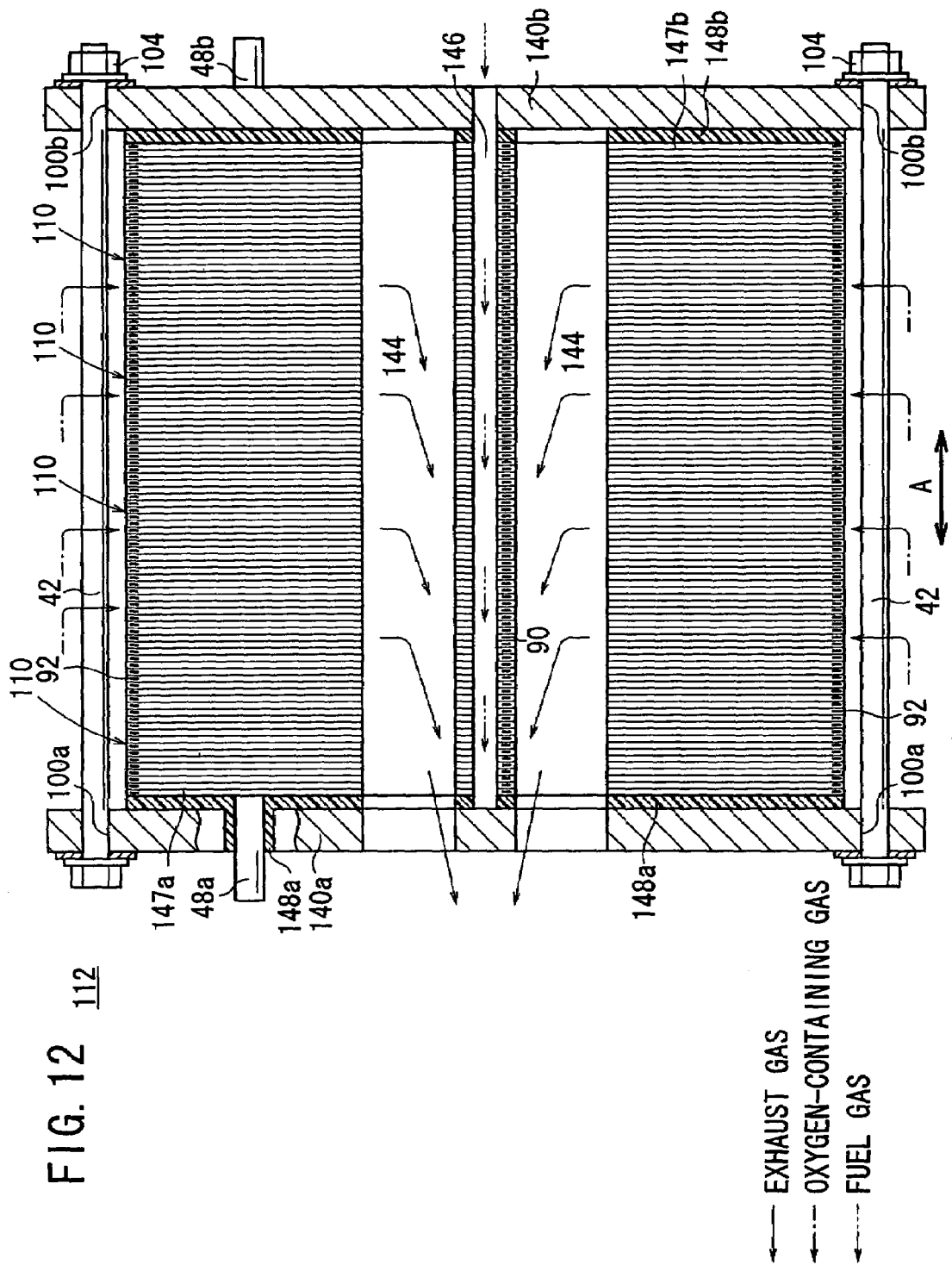
FIG. 12 is a cross sectional view showing a part of the fuel cell stack.

FIG. 11 is a view schematically showing a fuel cell stack 112 formed by stacking a plurality of fuel cells 110 according to a second embodiment of the present invention. FIG. 12 is a cross sectional view showing a part of the fuel cell stack 112. The constituent elements that are identical to those of the fuel cell stack 12 formed by stacking the fuel cells 10 according to the first embodiment are labeled with the same reference numeral, and description thereof is omitted.

Figure 13:
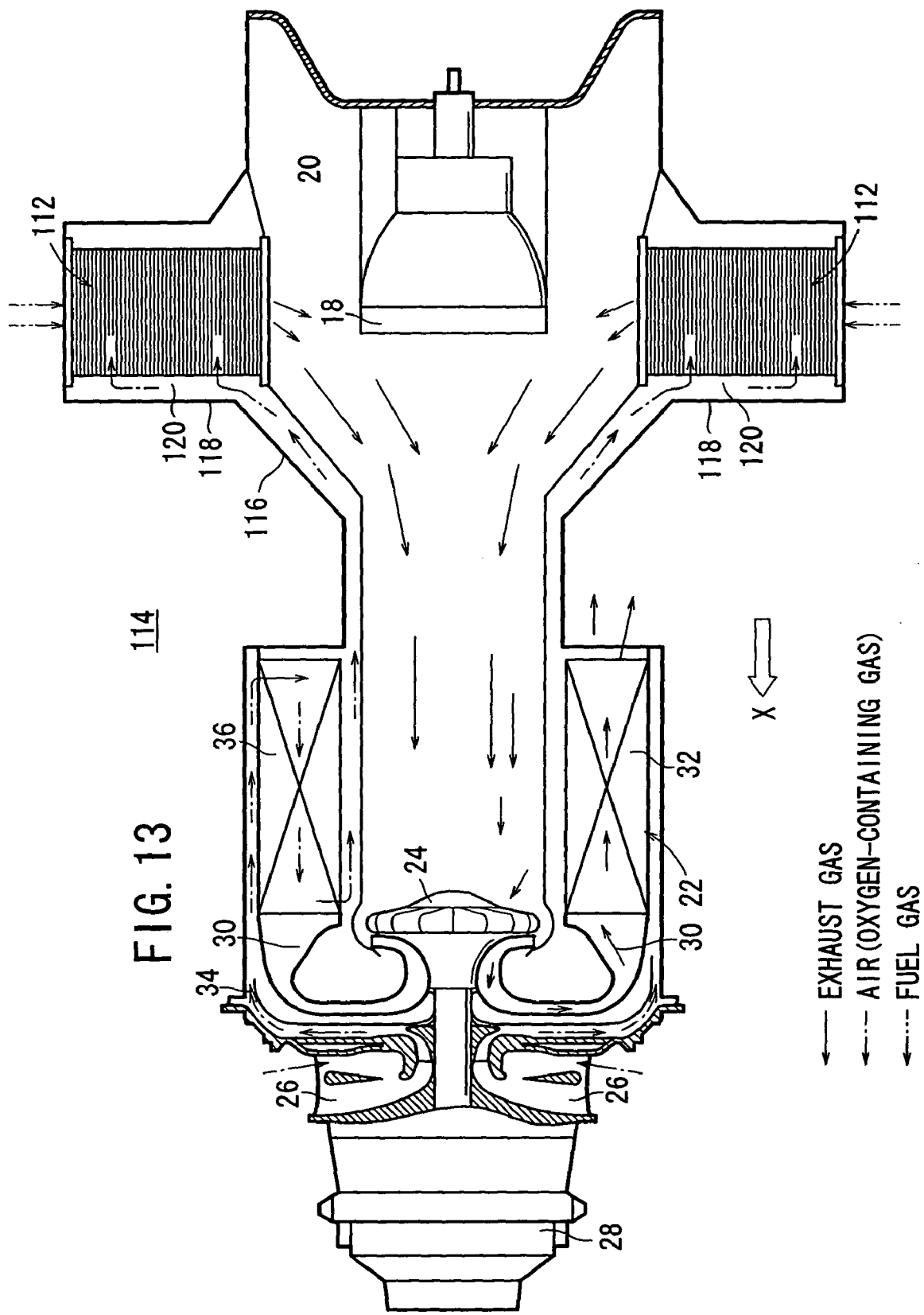
FIG. 13 is a view schematically showing a gas turbine including a plurality of the fuel cell stacks.
Figure 14:
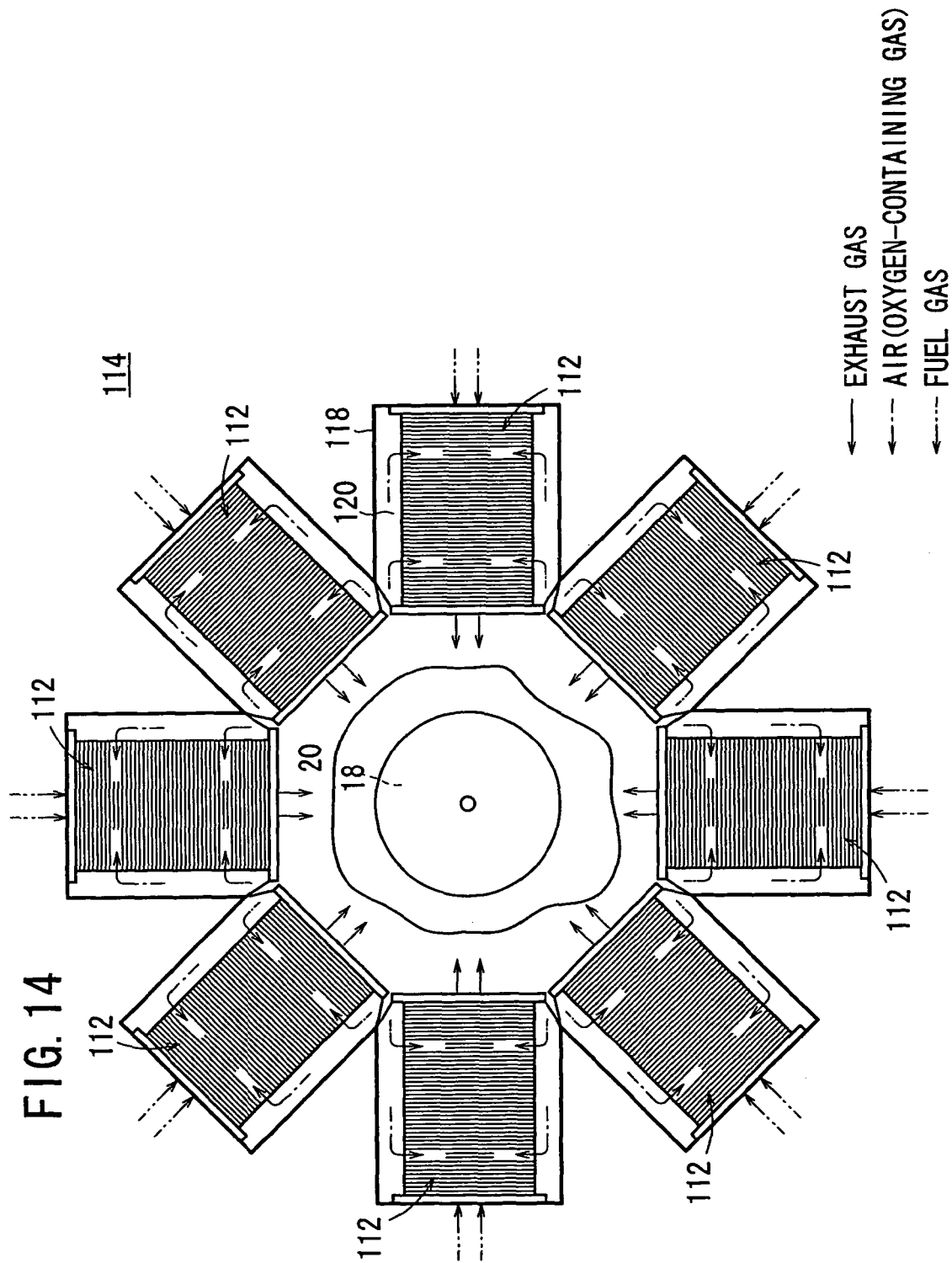
FIG. 14 is a front view showing the gas turbine.

In FIG. 13, a plurality of fuel cell stacks 112 are placed in a gas turbine 114. As shown in FIG. 14, for example, eight fuel cell stacks 112 are provided around a combustor 18 at intervals of 45° in the casing 116. Each of the fuel cell stacks 112 is covered by a cover 118 attached to the casing 116. Pressurized air inlet passages 120 are formed inside the respective covers 118. The exhaust gas produced after reaction of the fuel gas and the oxygen-containing gas is discharged from each central portion of the fuel cell stacks 112.

As shown in FIG. 11, the fuel cell stack 112 is formed by stacking a plurality of fuel cells 110 in the stacking direction indicated by the arrow A. Each of the fuel cells 110 has a shape of a disk having a curved outer section. End plates 147a, 147b are provided outside the outermost fuel cells 110 at opposite ends in the stacking direction, respectively. Insulator plates 148a, 148b are provided on the outside the end plates 147a, 147b. Further, flanges 140a, 140b are provided on the outside of the insulator plates 148a, 148b. The fuel cells 110, the end plates 147a, 147b, the insulator plates 148a, 148b, and the flanges 140a, 140b are tightened together by a plurality of (e.g., eight) tightening bolts 42. At the center of the fuel cell stack 112., a circular fuel gas supply hole 146 is formed for supplying the fuel gas to the fuel cell stack 112. The fuel gas supply hole 146 has a bottom at the flange 140a, and extends in the stacking direction indicated by the arrow A (see FIG. 12).

A plurality of (e.g., four) exhaust gas passages 144 are formed around the fuel gas supply hole 146. Each of the exhaust gas passages 144 has a bottom at the flange 140b, and extends in the direction indicated by the arrow A. The flange 140a is insulated from the end plate 147a by the insulator plate 148a, and the flange 140b is insulated from the end plate 147b by the insulator plate 148. The end plates 147a, 147b have output terminals 48a, 48b, respectively.

Figure 15:
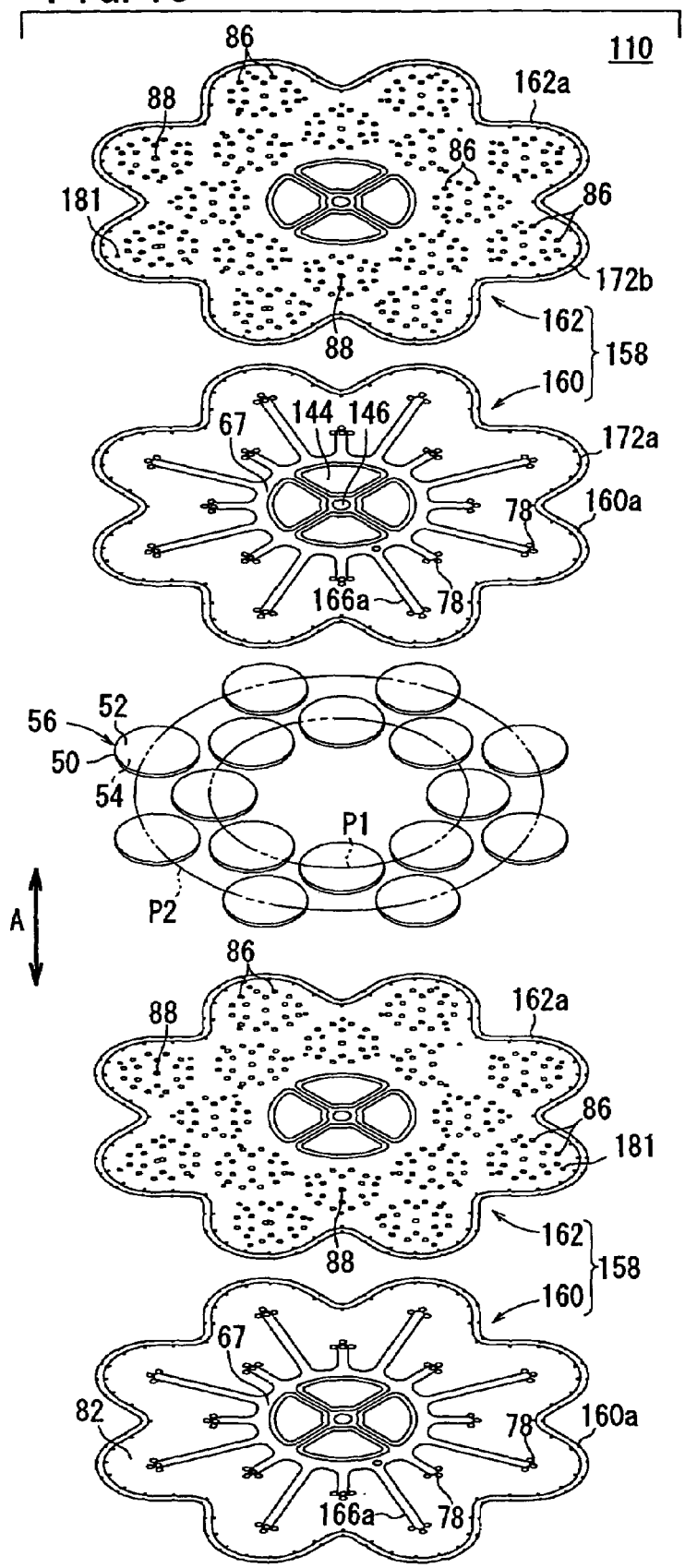
FIG. 15 is an exploded perspective view of the fuel cell.
Figure 16:
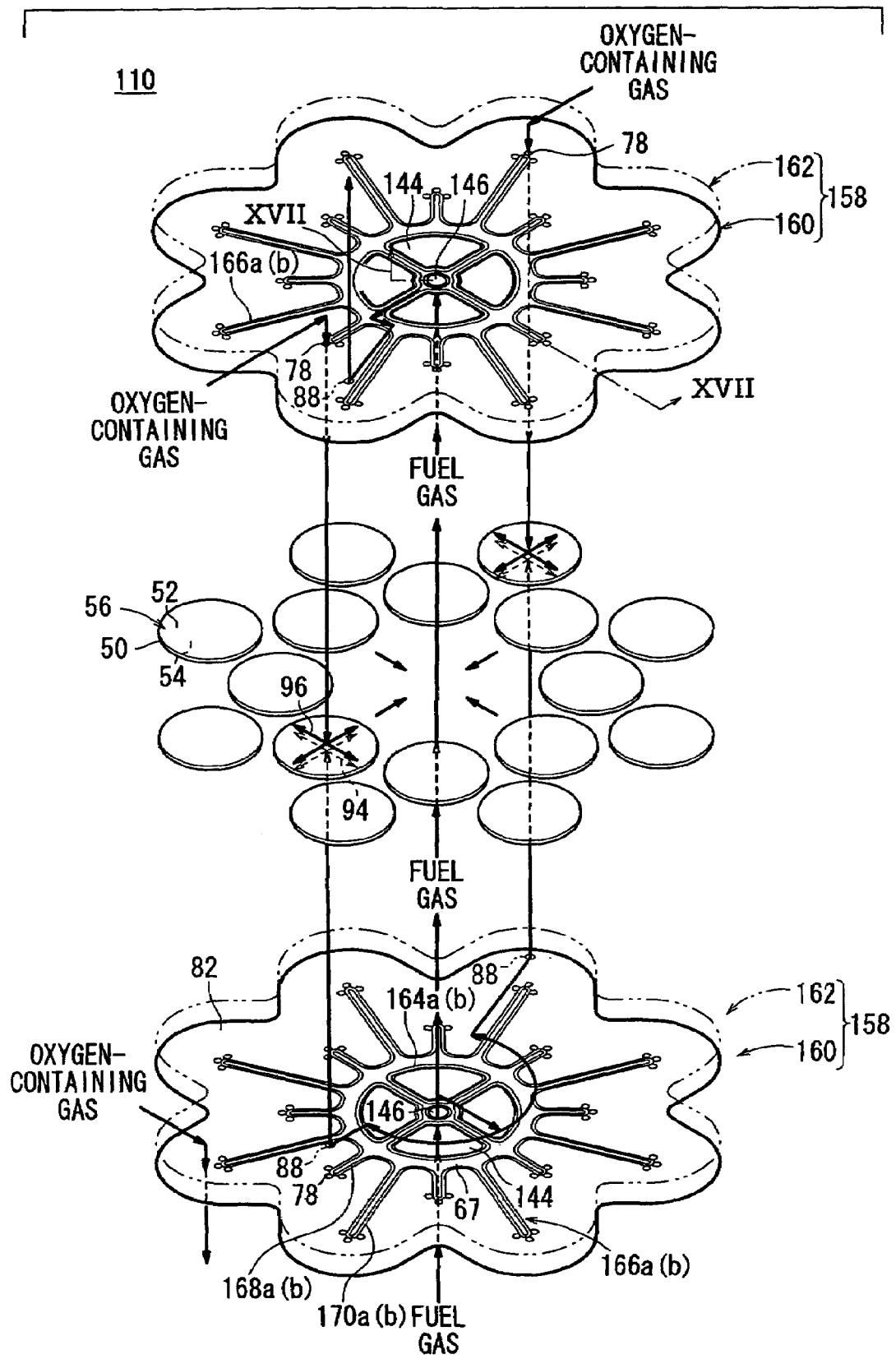
FIG. 16 is a perspective view showing a part of the fuel cell and operation of the fuel cell.

As shown in FIGS. 15 and 16, a plurality of (e.g., 16) electrolyte electrode assemblies 56 are interposed between a pair of separators 158 to form the fuel cell 110. Each of the separators 158 includes a plurality of (e.g., two) plates 160, 162 which are stacked together. Each of the plates 160, 162 is formed of a stainless alloy, for example. Curved outer sections 160a, 162a are formed on the plates 160, 162, respectively.

Figure 17:
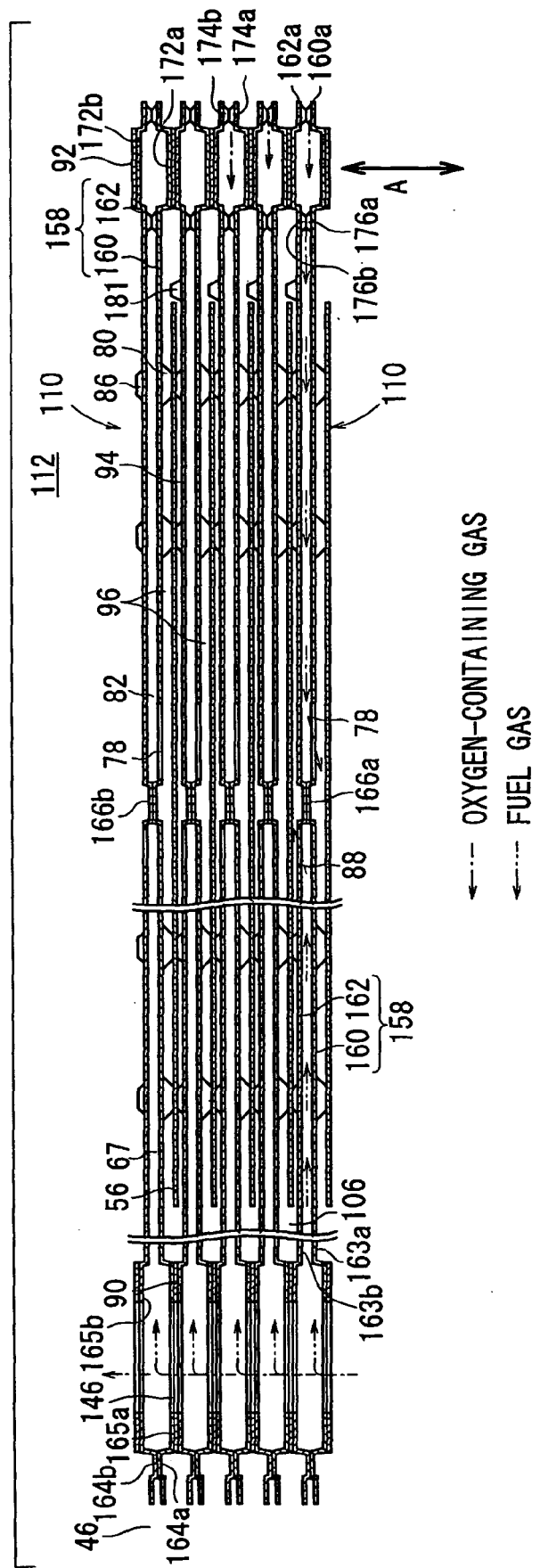
FIG. 17 is a cross sectional view, with partial omissions, showing the fuel cell stack taken along a line XVII—XVII of FIG. 16.
Figure 18:
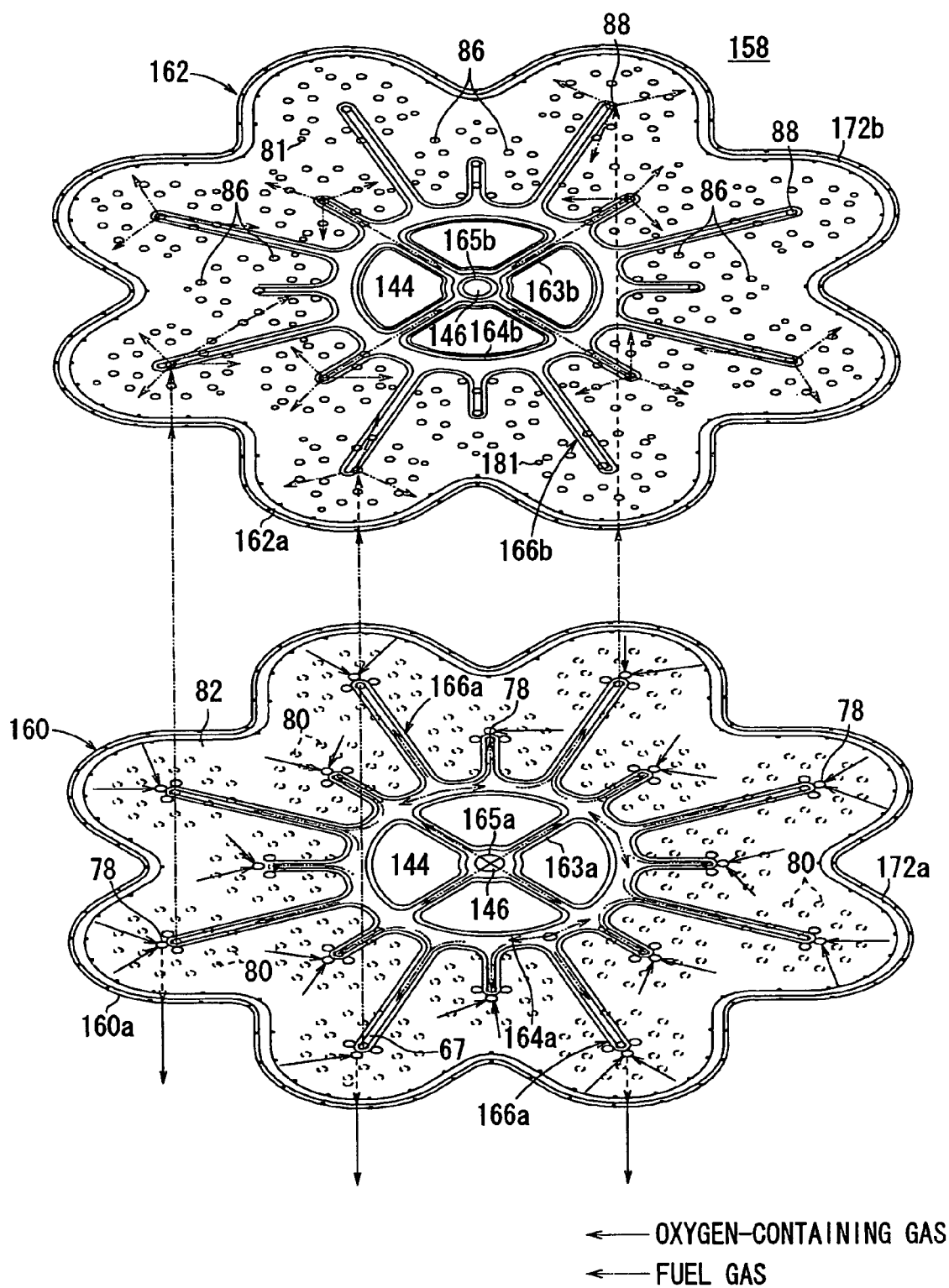
FIG. 18 is an exploded perspective view showing a separator of the fuel cell.
Figure 20:
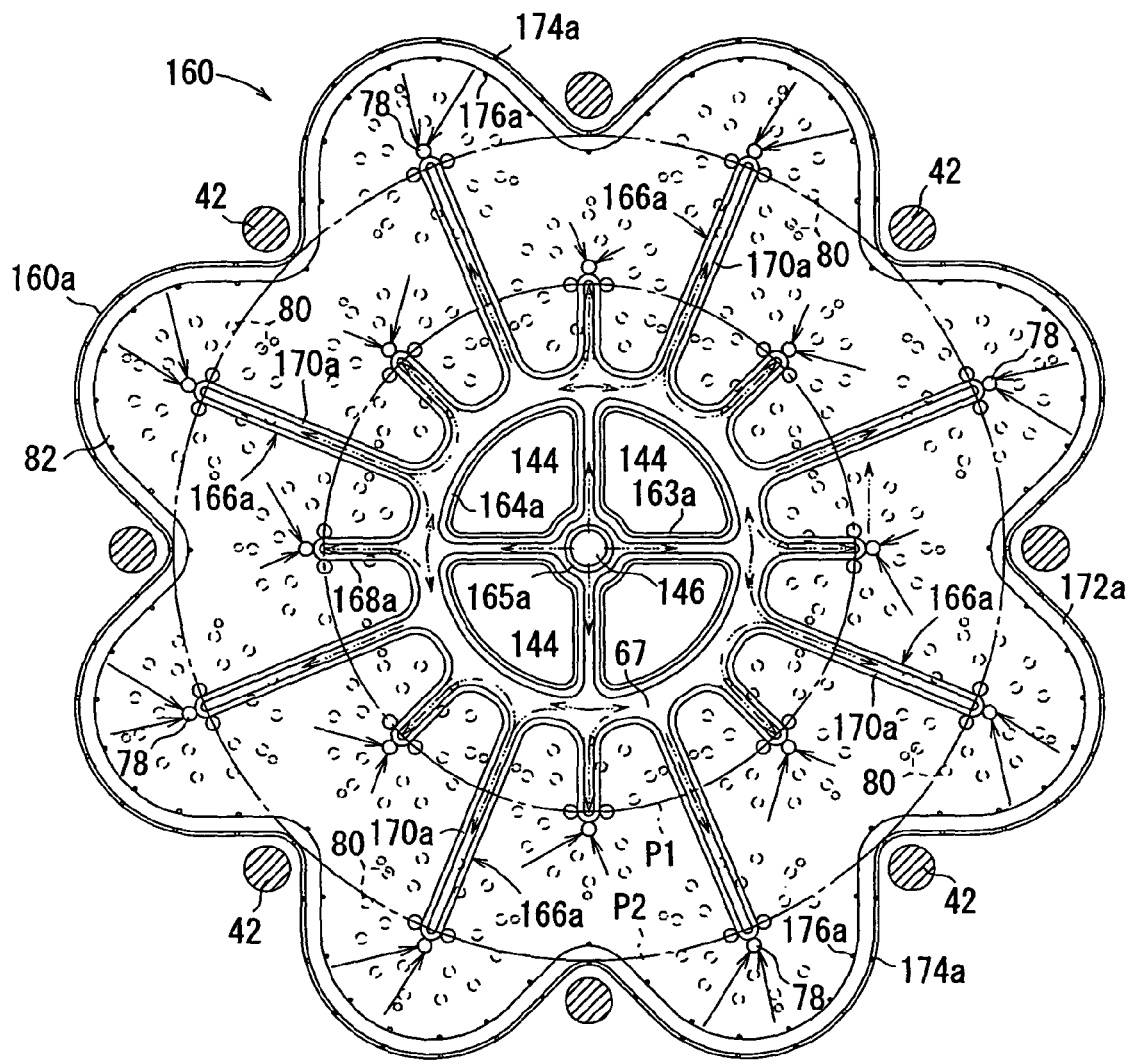
FIG. 20 is a front view showing a plate of the separator.

As shown in FIGS. 17, 18, and 20, ribs 163a are provided around the center of the plate 160 to form the fuel gas supply hole 146 and the four exhaust gas passages 144. The plate 160 has four inner ridges 164a around the respective exhaust gas passages 144. The inner ridges 164a protrude toward the plate 162. The plate 160 has a protrusion 165a around the fuel gas supply hole 146. The protrusion 165a protrudes away from the plate 162.

An outer ridge 166a is formed radially on the plate 160. A fuel gas channel 67 is formed inside the inner ridges 164a and the outer ridge 166a. The fuel gas channel 67 is connected to the fuel gas supply hole 146.

The outer ridge 166a includes a plurality of first walls 168a and second walls 170a each extending radially outwardly by a predetermined distance. The first walls 168a and the second walls 170a are formed alternately. As shown in FIG. 20, each of the first walls 168a extends to an inner circle P1 which is a virtual line passing through centers of eight inner electrolyte electrode assemblies 56. Each of the second walls 170a extends to an outer circle P2 which is a virtual line passing through centers of eight outer electrolyte electrode assemblies 56. The eight inner electrolyte electrode assemblies 56 are arranged along the inner circle P1, and the eight outer electrolyte electrode assemblies 56 are arranged along the outer circle P2.

At each end portion of the first walls 168a and at each end portion of the second walls 170a, three oxygen-containing gas inlets 78 are formed. The oxygen-containing gas inlets 78 are formed to pass through the plate 160. First bosses 80 are formed on the plate 160. The first bosses 80 protrude toward, and contact the electrolyte electrode assemblies 56 arranged along the inner circle P1 and the outer circle P2.

Figure 19:
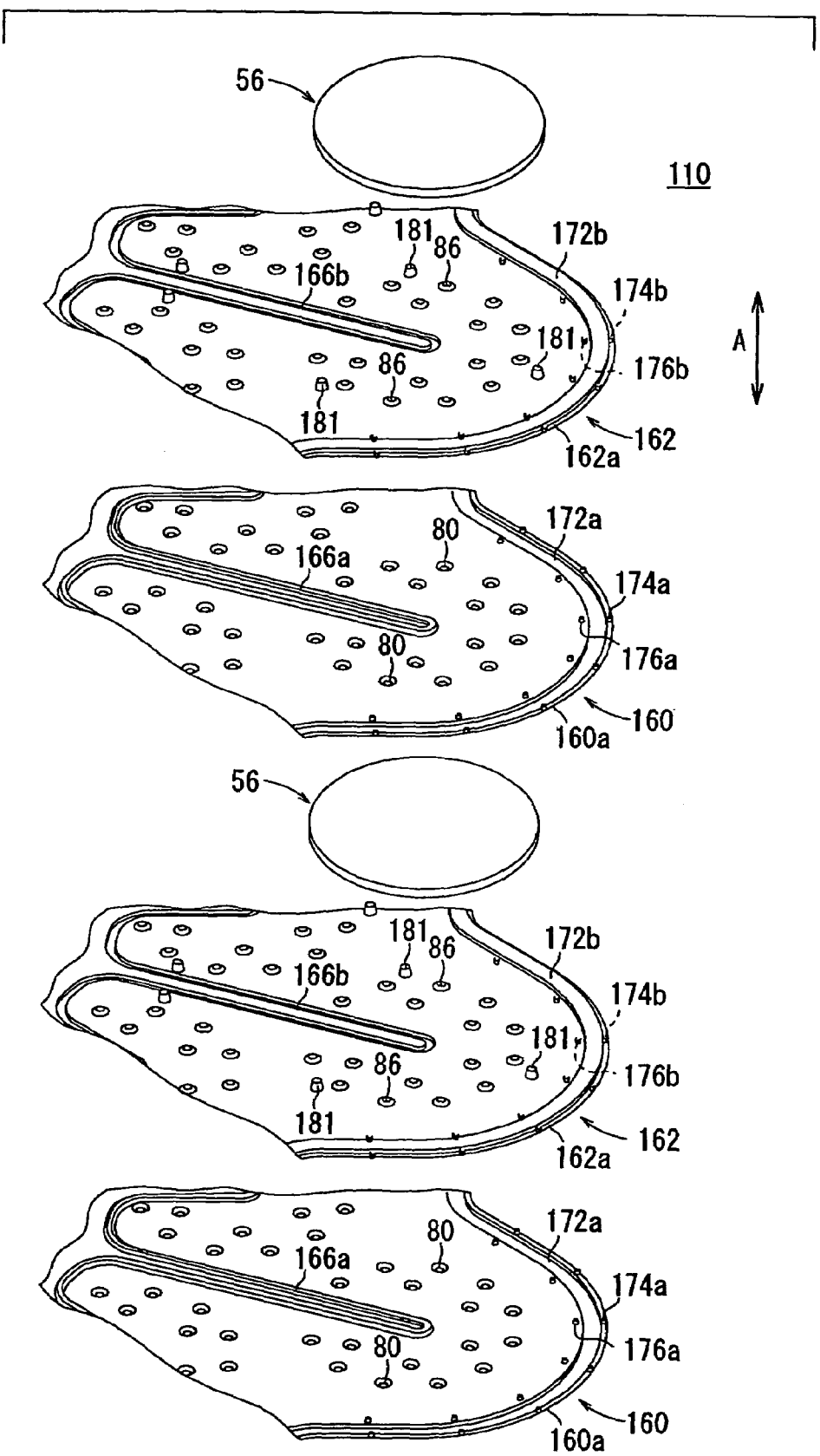
FIG. 19 is an enlarged view showing a part of the fuel cell.

As shown in FIGS. 17, 19, and 20, a first curved protrusion 172a is formed on the plate 160 inside the curved outer section 160a. The first curved protrusion 172a has the shape identical to the curved outer section 160a, and protrudes away from the plate 162. Outer projections 174a and inner projections 176a are provided at predetermined intervals on opposite sides of the first curved protrusion 172a to face each other, or in a zigzag pattern.

Figure 21:
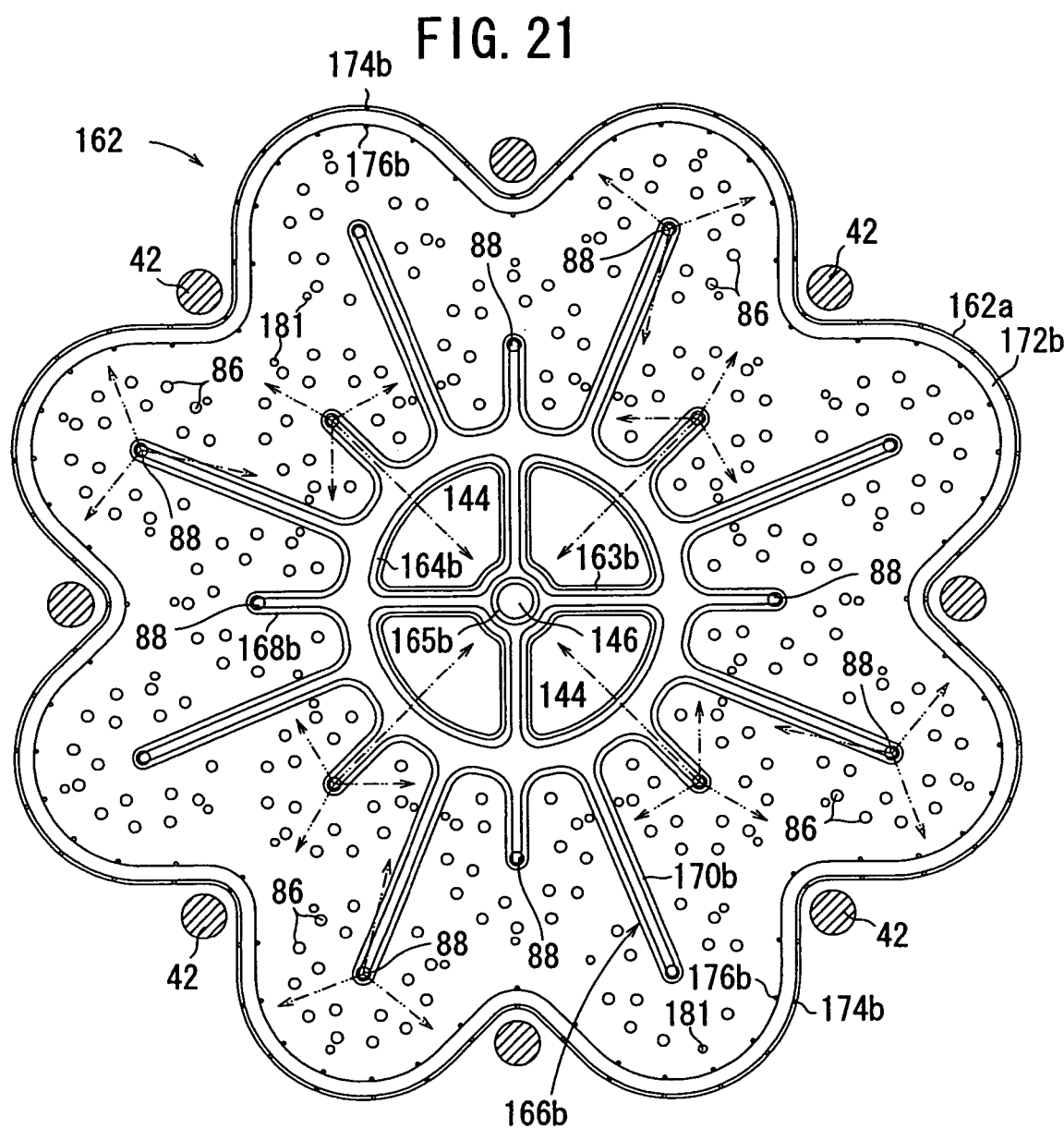
FIG. 21 is a front view showing the other plate of the separator.

As shown in FIGS. 17, 18, and 21, ribs 163b facing the ribs 163a are provided around the center of the plate 162. The plate 162 has four inner ridges 164b protruding toward the plate 160, and a protrusion 165b protruding away form the plate 160.

An outer ridge 166b protruding toward the outer ridge 166a of the plate 160 is formed on the plate 162. The inner ridges 164a contact the inner ridges 164b, and the outer ridge 166a contact the outer ridge 166b to form the fuel gas channel 67 between the plate 160 and the plate 162. The fuel gas channel 67 is connected to the fuel gas supply hole 146. The outer ridge 166b includes a plurality of first walls 168b and second walls 170b each extending radially outwardly by a predetermined distance. The first walls 168b and the second walls 170b are formed alternately.

Protrusions 181 for positioning the eight electrolyte electrode assemblies 56 along the inner circle P1 and the eight electrolyte electrode assemblies 56 along the outer circle P2 are provided on the plate 162. At least three protrusions 181 are formed for each of the electrolyte electrode assemblies 56. In the illustrated embodiment, three protrusions 181 are formed for positioning one electrolyte electrode assembly 56. When the electrolyte electrode assembly 56 is positioned inside the protrusions 181, there is some clearance between the protrusions 181 and the electrolyte electrode assembly 56. The height of the protrusions 181 is greater than the height of the second bosses 86 (see FIG. 17).

As shown in FIGS. 17, 19, and 21, a second curved protrusion 172b is formed on the plate 162 inside the curved outer section 162a The second curved protrusion 172b has the shape identical to the curved outer section 162a, and protrudes away from the plate 160. Outer projections 174b and inner projections 176b are provided at predetermined intervals on opposite sides of the second curved protrusion 172b to face each other, or in a zigzag pattern.

The fuel gas channel 67 is surrounded by the inner ridges 164a, 164a, and the outer ridges 166a, 166b between the plate 160 and the plate 162. An oxygen-containing gas channel 82 is formed outside the outer ridges 166a, 166b between the plate 160 and the plate 162 (see FIG. 22). The oxygen-containing gas channel 82 is connected to oxygen-containing gas inlets 78 formed on the plate 160.

As shown in FIG. 17, the separator 158 has an insulator seal 90 for sealing the fuel gas supply hole 146. The insulator seal 90 is formed by placing a ceramics plate, or thermal spraying ceramics to the protrusion 165a of the plate 160 or the projection 165b of the plate 162. The first curved protrusion 172a of the plate 160 and the second curved protrusion 172b of the plate 162 protrude away from each other. An insulator seal 92 formed of ceramics or the like is provided on the first curved protrusion 172a or the second curved protrusion 172b by sandwiching the insulator seal 92 between the first curved protrusion 172a and the second curved protrusion 172b or by thermal spraying.

The fuel gas channel 67 is formed between the plates 160, 162 of the separator 158, and connected to the fuel gas supply hole 146. The oxygen-containing gas channel 82 and the fuel gas channel 67 are formed in the same area inside the separator 158. The oxygen-containing gas channel 82 is open to the outside through an opening formed between the first curved protrusion 172a of the plate 160, and the second curved protrusion 172b of the plate 162, of the separator 158.

Each of the separators 158 stacked in the stacking direction has the first bosses 80 and the second bosses 86 for sandwiching the electrolyte electrode assemblies 56. The first bosses 80 and the second bosses 86 function as current collectors. The inner ridges 164a of the plate 160 contact the inner ridges 164b of the plate 160, and the outer ridge 166a of the plate 160 contacts the outer ridge 166b of the plate 162 for serially connecting the fuel cells 110 in the direction indicated by the arrow A.

As shown in FIGS. 11 and 12, the fuel cells 110 are stacked in the direction indicated by the arrow A. The end plates 147a, 147b are stacked on the outermost fuel cells 110 at opposite ends. The insulator plates 148a, 148b are stacked on the outside of the end plates 147a, 147b, respectively, and the flanges 140a, 140b are stacked on the outside of the insulator plates 148b, 148b, respectively. The flanges 140a, 140b has holes 10a, 100b at positions corresponding to the inward curves of the curved outer sections 160a, 162a of the plates 160, 162. Tightening bolts 42 are inserted in the holes 100a, 100b. Ends of the tightening bolts 42 are screwed into nuts 104 for tightening the fuel cells 110 together with a suitable force.

Next, operation of the fuel cell stack 112 will be described briefly.

As shown in FIG. 17, the inner ridges 164a and the outer ridge 166a of the plate 160 are connected to the inner ridges of 164b and the outer ridge 166b of the plate 162 by brazing, and the ring-shaped insulator seal 90 is provided on the plate 160 or the plate 162 around the fuel gas supply hole 146 by thermal spraying, for example. Further, the insulator seal 92 having curves is provided on the first curved protrusion 172a of the plate 160 or the second curved protrusion 172b of the plate 162 by thermal spraying, for example.

The separator 158 thus formed has the fuel gas channel 67 and the oxygen-containing gas channel 82 in the same area between the plate 160 and the plate 162. The fuel gas channel 67 is connected to the fuel gas supply hole 146, and the oxygen-containing gas channel 82 is open to the outside through an opening between the curved outer sections 160a, 162a.

Then, the electrolyte electrode assemblies 56 are interposed between a pair of separators 158. As shown in FIGS. 15 and 16, sixteen electrolyte electrode assemblies 56 are interposed between the plate 160 of one separator 158 and the plate 162 of the other separator 158. Eight electrolyte electrode assemblies 56 are arranged along the inner circles P1, and eight electrolyte electrode assemblies 56 are arranged along the outer circles P2.

Three protrusions 181 are provided for positioning each of the electrolyte electrode assemblies 56. The electrolyte electrode assembly 56 is placed inside the three protrusions 181. The first bosses 80 of the plate 160 and the second bosses 88 of the plate 162 protrude toward, and contact the electrolyte electrode assembly 56 in the protrusions 181.

Figure 22:
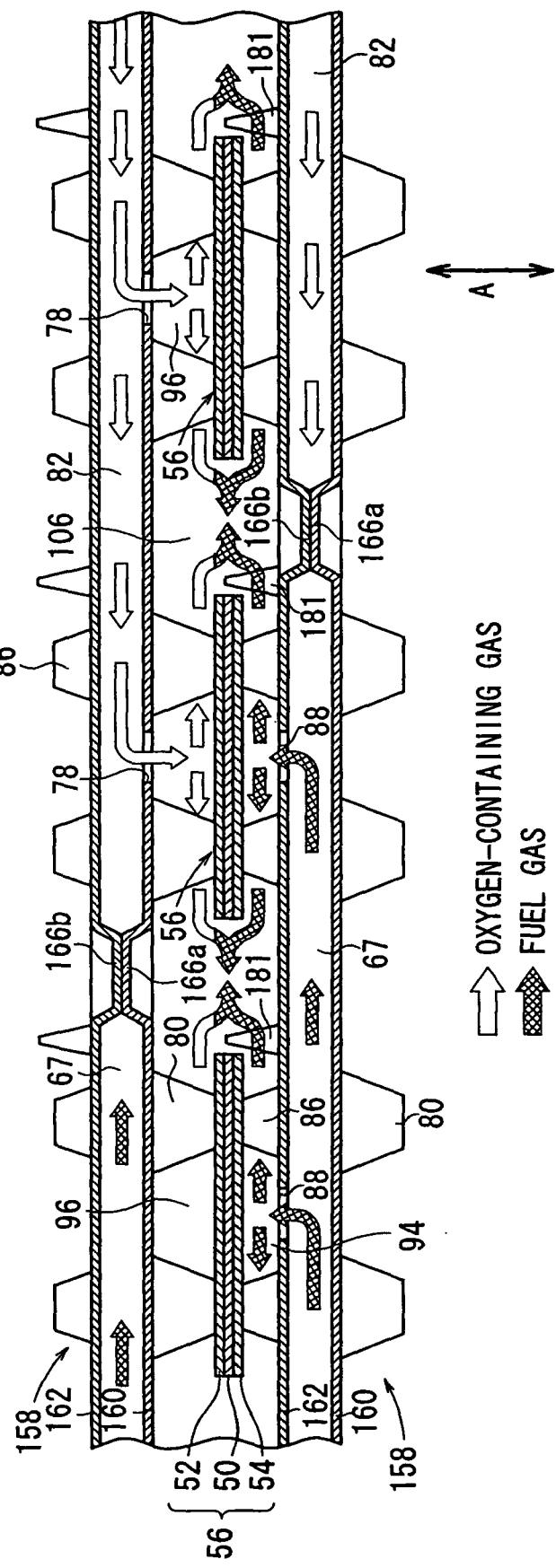
FIG. 22 is a view showing operation of the fuel cell.

As shown in FIG. 22, an oxygen-containing gas flow passage 96 is formed between the cathodes 52 of the electrolyte electrode assemblies 56 and the plate 160. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 162. The fuel gas flow passage 94 is connected to the fuel gas channel 67 through the fuel gas inlets 88. Further, an exhaust gas passage 106 is formed between the separators 158 for guiding the exhaust gas (mixed gas of the fuel gas and the oxygen-containing gas after reaction) to the exhaust gas passages 144.

A plurality of the fuel cell 110 as assembled above are stacked in the direction indicated by the arrow A to form the fuel cell stack 112 (see FIGS. 11 and 12).

As shown in FIGS. 17 and 22, in the second embodiment, for positioning each of the electrolyte electrode assemblies 56, three protrusions 181 are formed integrally from the plate 162 of the separator 158. Therefore, the electrolyte electrode assembly 56 can be positioned accurately at a desired position simply by placing the electrolyte electrode assembly 56 inside the three protrusions 181.

As described above, the positioning of the electrolyte electrode assemblies 56 between the separators 158 can be performed with a high degree of accuracy. Therefore, the assembling efficiency of the fuel cells 110 can be greatly improved. Further, the improvement of the accuracy in positioning the electrolyte electrode assemblies 56 enables the fuel gas and the oxygen-containing gas to be supplied to the centers of the electrolyte electrode assemblies accurately. Thus, the power generation performance of the fuel cells 110 is improved desirably.

Further, the electrolyte electrode assembly 56 is placed inside the three protrusions 181 with some clearance. Therefore, even if the electrolyte electrode assembly 56 is thermally expanded, the electrolyte electrode assembly 56 is not damaged or displaced by the stress due to the contact with the protrusions 181.

Further, the protrusions 181 are formed integrally with the plate 161 by press molding, for example. Thus, no special components for positioning the electrolyte electrode assemblies 56 are needed. The number of components in the separator 158 does not increase. Thus, the separator 158 has a simple and light structure. The fuel cell 110 can be assembled easily, and the fuel cell 110 has a reliable power generation performance.

The protrusions 181 are formed on the side of the fuel gas passages having a low height, i.e., on the side of the second bosses 86, the height of the protrusions 181 is relatively low.

As shown in FIGS. 13 and 14, in casing 116 of the gas turbine 114, eight fuel cell stacks 112 are provided around the combustor 18 at intervals of 45°. Thus, a large electromotive force is generated while the overall length of the gas turbine 114 is short.

Figure 23:
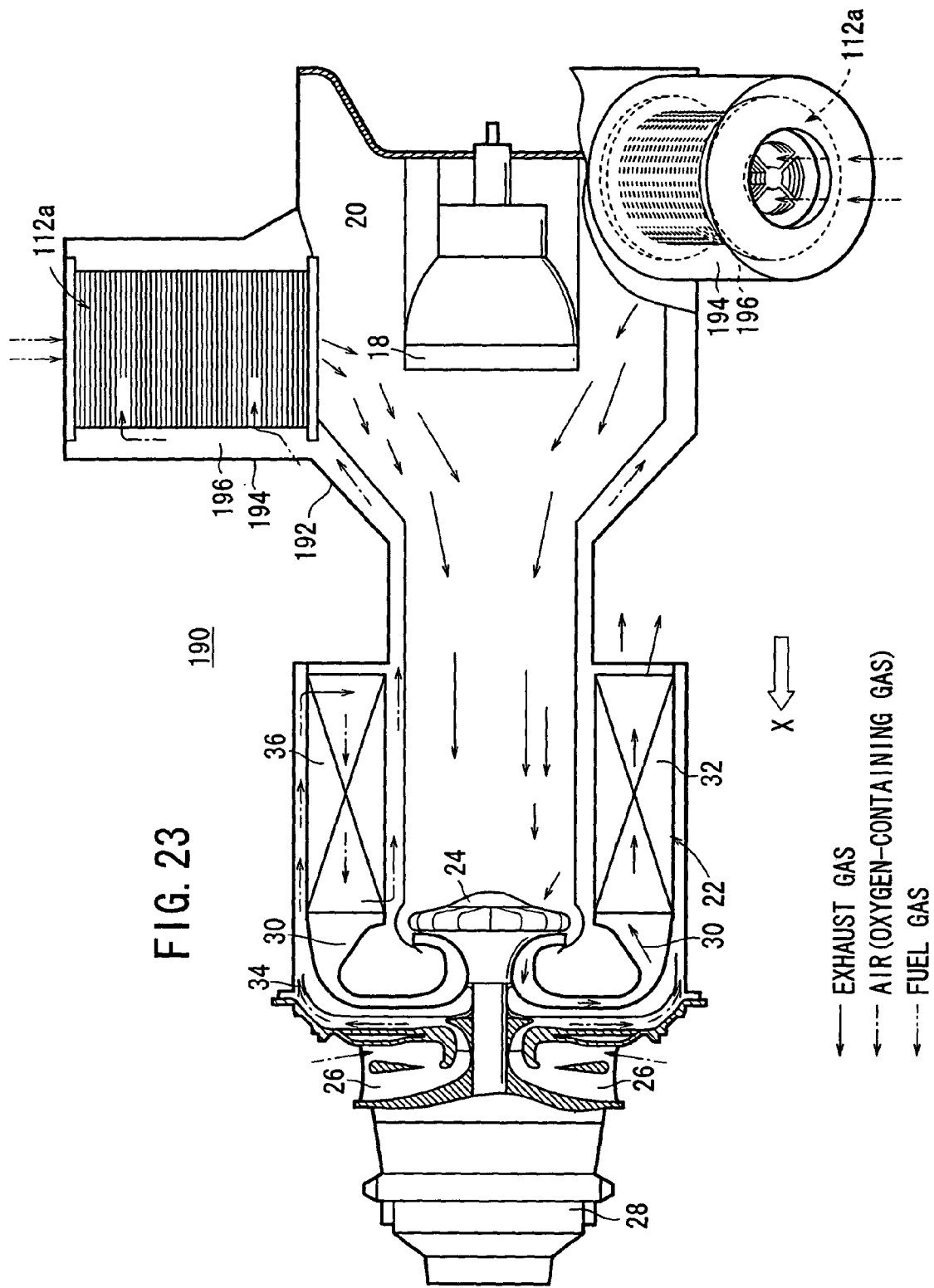
FIG. 23 is a cross sectional view schematically showing a gas turbine including relatively large fuel cell stacks according to a third embodiment of the present invention.
Figure 24:
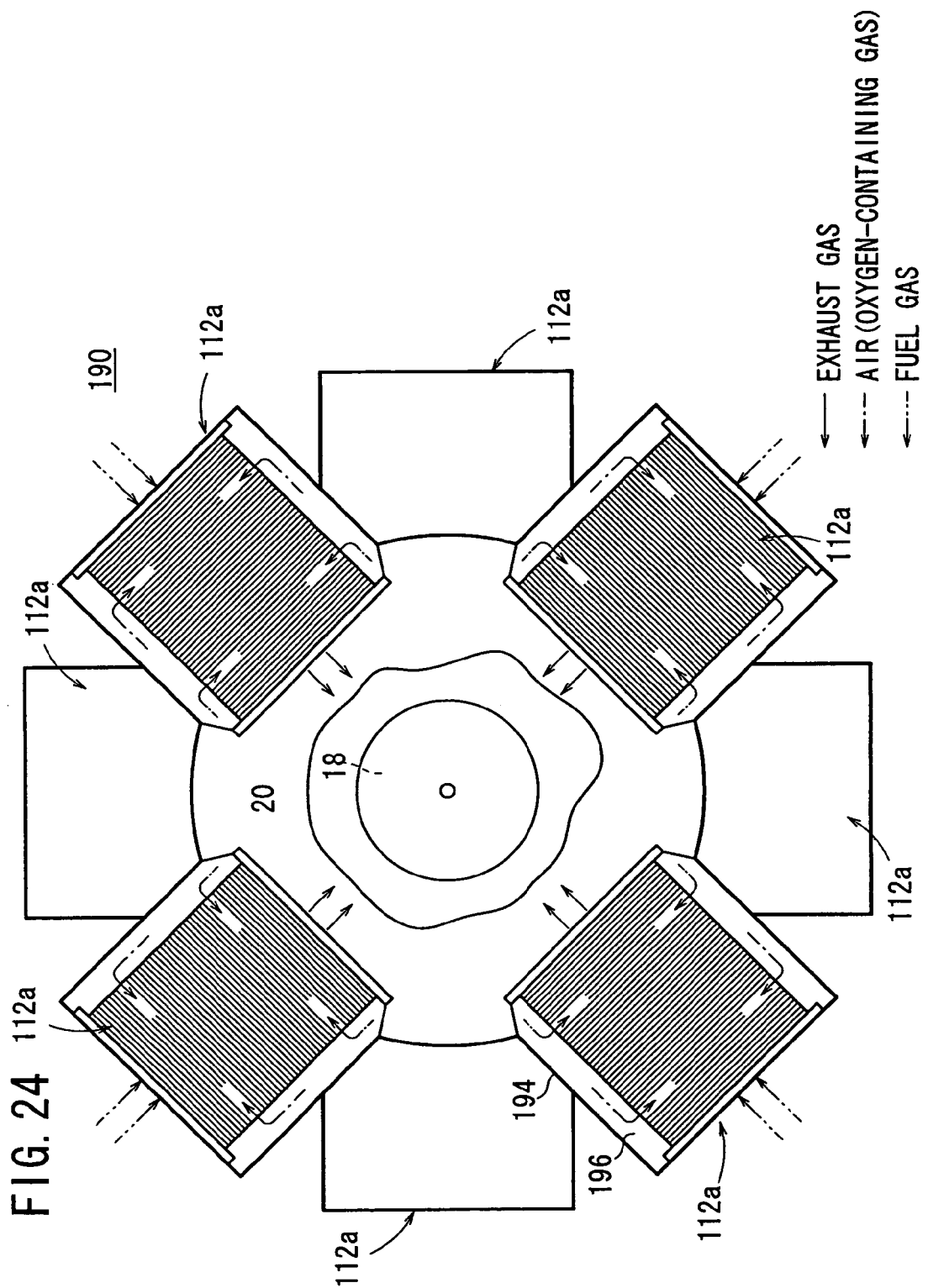
FIG. 24 is a front view showing the gas turbine.
Figure 25:
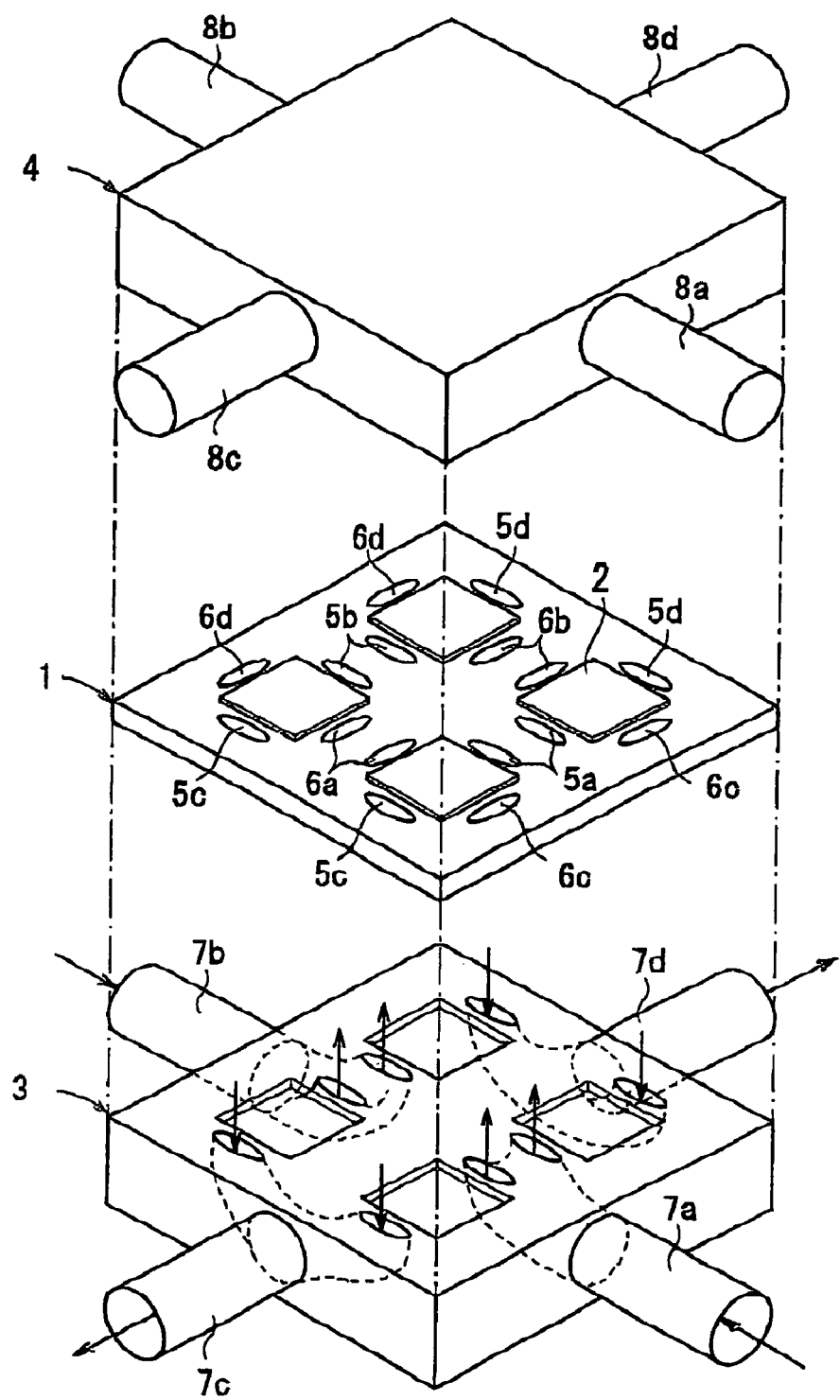
FIG. 25 is an exploded perspective view showing a conventional fuel cell system.

FIG. 23 is a cross sectional view schematically showing a gas turbine 190 including relatively large fuel cell stacks 112a according to a third embodiment of the present invention, and FIG. 24 is a front view showing the gas turbine 190.

In the gas turbine 190, four fuel cell stacks 112a are arranged along a first circle in the casing 192 at intervals of 90° and four fuel cell stacks 112a are arranged along a second circle in the casing 192 at intervals of 90°. The first circle is spaced from the second circle at a predetermined distance in an axial direction of the casing 192 indicated by an arrow X. Orientation of the four fuel cell stacks 112a arranged along the first circle is shifted by 45° from the second fuel cell stacks 112a arranged along the second circle. Therefore, the fuel cell stacks 112a do not contact with each other. Each of the fuel cell stacks 112a is covered by a cover 194, and a hot air supply passage 196 is formed inside the cover 194.

In the gas turbine 190, the four fuel cells stacks 112a are disposed at intervals of 90° along the first circle, and the additional four fuel cells 112a are disposed at intervals of 90° along the second circle. The orientation of the fuel cell stacks 112a along the first circle is shifted by 45° form the fuel cell stacks 112a arranged along the second circle. Thus, a large number of (eight) fuel cells 112a having a relatively large size can be placed in the gas turbine 190 for improving the power generation efficiency. The outer circumferential dimension of the gas turbine 190 is not large, and the gas turbine 190 is compact.

In the first through third embodiments, the fuel cell stacks 12, 112, 112a are used in the gas turbines 14, 114, and 190. However, the fuel cell stacks 12, 112, 112a can be used in other applications. For example, the fuel cell stacks 12, 112, 112a can be mounted on vehicles.

In the present invention, a plurality of electrolyte electrode assemblies are interposed between a pair of separators. Each of the separators includes a plurality of plates which are stacked together to form a fuel gas channel and an oxygen-containing gas channel. Thus, the electrolyte electrode assemblies can be made compact and thin. Temperature distribution in the electrode surfaces is small.

In particular, when solid oxide is used in the fuel cell system, damages of the solid oxide are prevented, while reducing the resistance polarization to improve the power outputting performance. The fuel gas channel and the oxygen-containing gas channel are formed inside the separator. Therefore, the sealing structure is simplified, and the desired sealing performance can be maintained reliably. The overall fuel cell is compact, and the power collecting efficiency of the fuel cell can be improved easily.

Further, in the present invention, protrusions are formed on the surface of the separators for positioning the electrolyte electrode assemblies. Thus, the positioning of the electrolyte electrode assemblies between the separators can be performed accurately. The electrolyte electrode assemblies are not displaced due to heat or the like. Since the positioning of the electrolyte electrode assemblies can be made simply and reliably, the assembling efficiency of the fuel cell can be greatly improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a pair of separators and electrolyte electrode assemblies interposed between said separators, said electrolyte electrode assemblies each including an anode, and a cathode, and an electrolyte interposed between said anode and cathode, wherein each of said separators includes a plurality of plates stacked together;

a fuel gas channel for supplying a fuel gas to said anode, and an oxygen-containing gas channel for supplying an oxygen-containing gas to said cathode are formed between said plates; and at least one of said plates has protrusions for positioning said electrolyte electrode assemblies between said separators, wherein at least three of said protrusions are provided around each of said electrolyte electrode assemblies so that said electrolyte electrode assemblies are arranged along at least one virtual circle concentric with a central axis of said separators.

2. A fuel cell according to claim 1, wherein said virtual circles include an inner circle and an outer circle, and electrolyte electrode assemblies arranged on said inner circle are out of radial alignment with electrolyte electrode assemblies arranged on said outer circle.

3. A fuel cell according to claim 1, wherein each of said electrolyte electrode assemblies is provided inside said at least three protrusions with a clearance.

4. A fuel cell according to claim 1, wherein said electrolyte is a solid oxide.

5. A fuel cell according to claim 1, wherein said fuel gas and said oxygen-containing gas are supplied through said fuel gas channel and said oxygen-containing gas channel to central regions on opposite surfaces of said electrolyte electrode assemblies, respectively.

6. A fuel cell according to claim 1, wherein said fuel gas channel and said oxygen-containing gas channel are provided between two of said plates.

7. A fuel cell according to claim 6, wherein a discharge passage for discharging said fuel gas and said oxygen-containing gas after reaction is provided between said separators.

8. A fuel cell according to claim 1, wherein a circular hole extends through said separators centrally;

said electrolyte electrode assemblies have a circular disk shape; and said electrolyte electrode assemblies are arranged around said circular hole, along at least one virtual circle concentric with said circular hole.

9. A fuel cell according to claim 8, wherein said electrolyte electrode assemblies are arranged around said circular hole, along at least two virtual circles concentric with said circular hole.

* * * * *